US007054860B2

(12) United States Patent
Inaba et al.

(10) Patent No.: US 7,054,860 B2
(45) Date of Patent: May 30, 2006

(54) METHOD AND SYSTEM FOR RETRIEVING A DOCUMENT AND COMPUTER READABLE STORAGE MEDIUM

(75) Inventors: Yasuhiko Inaba, Yokohama (JP); Katsumi Tada, Kawasaki (JP); Natsuko Sugaya, Kawasaki (JP); Tadataka Matsubayashi, Yokohoma (JP); Akihiko Yamaguchi, Yokohama (JP); Mikihiko Tokunaga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/678,065

(22) Filed: Oct. 6, 2003

(65) Prior Publication Data

US 2004/0068495 A1 Apr. 8, 2004

Related U.S. Application Data

(63) Continuation of application No. 09/648,766, filed on Aug. 28, 2000, now abandoned.

(30) Foreign Application Priority Data

Jun. 2, 2000 (JP) ............................. 2000-170416

(51) Int. Cl.
*G06F 7/00* (2006.01)
*G06F 17/30* (2006.01)

(52) U.S. Cl. ...................... 707/5; 707/102; 707/201
(58) Field of Classification Search ............. 707/1–10, 707/100–102, 104.1, 200–201; 715/513, 715/531; 709/217, 218; 704/7, 9; 705/1, 705/5

See application file for complete search history.

(56) References Cited

U.S. PATENT DOCUMENTS

| 5,220,625 | A | | 6/1993 | Hatakeyama et al. ........ 715/809 |
| 5,418,946 | A | | 5/1995 | Mori |
| 5,628,008 | A | | 5/1997 | Hayashi ...................... 715/513 |
| 5,787,244 | A | | 7/1998 | Hiratsuka et al. |
| 5,893,092 | A | | 4/1999 | Driscoll |
| 5,893,909 | A | | 4/1999 | Nomura et al. |
| 6,014,672 | A | | 1/2000 | Satoh et al. |
| 6,041,323 | A | | 3/2000 | Kubota ........................ 707/5 |
| 6,055,535 | A | | 4/2000 | Suzuoka et al. |
| 6,078,913 | A | * | 6/2000 | Aoki et al. .................... 707/2 |
| 6,154,737 | A | | 11/2000 | Inaba et al. ................... 707/3 |

(Continued)

FOREIGN PATENT DOCUMENTS

JP 64-35627 2/1989

(Continued)

OTHER PUBLICATIONS

D. Harman, "Relevance Feedback and Other Query Modification Techniques", Information Retrieval—Data Structures & Algorithms, 1992, pp. 241-263.

*Primary Examiner*—Greta Robinson
*Assistant Examiner*—Miranda Le
(74) *Attorney, Agent, or Firm*—Mattingly, Stanger, Malur & Brundidge, P.C.

(57) ABSTRACT

In document retrieval having the relevance feedback function to modify a searching profile for retrieval on the basis of a user's evaluation to evaluate a search result as pertinent or impertinent, recommencement of the relevance feedback returned to a desired time is permitted. An evaluation inputted by a user, a searching profile modified by the evaluation and a search result based on the searching profile are all saved while making the correspondence between them. When a request for restoration of searching profile is made, a searching profile corresponding to an evaluation designated by the user is restored.

10 Claims, 20 Drawing Sheets

U.S. PATENT DOCUMENTS

| | | |
|---|---|---|
| 6,202,058 B1 | 3/2001 | Rose et al. |
| 6,212,517 B1 * | 4/2001 | Sato et al. ............... 707/5 |
| 6,269,368 B1 | 7/2001 | Diamond ............... 707/6 |
| 6,401,087 B1 | 6/2002 | Yanagimoto |
| 6,415,285 B1 | 7/2002 | Kitajima et al. |
| 6,424,963 B1 | 7/2002 | Ito et al. |
| 6,457,004 B1 * | 9/2002 | Nishioka et al. ............... 707/5 |
| 6,513,035 B1 | 1/2003 | Tanaka et al. ............... 707/5 |
| 2001/0047351 A1 * | 11/2001 | Abe |
| 2003/0028512 A1 * | 2/2003 | Stensmo |

FOREIGN PATENT DOCUMENTS

JP    11-143902    5/1999

* cited by examiner

FIG. 2
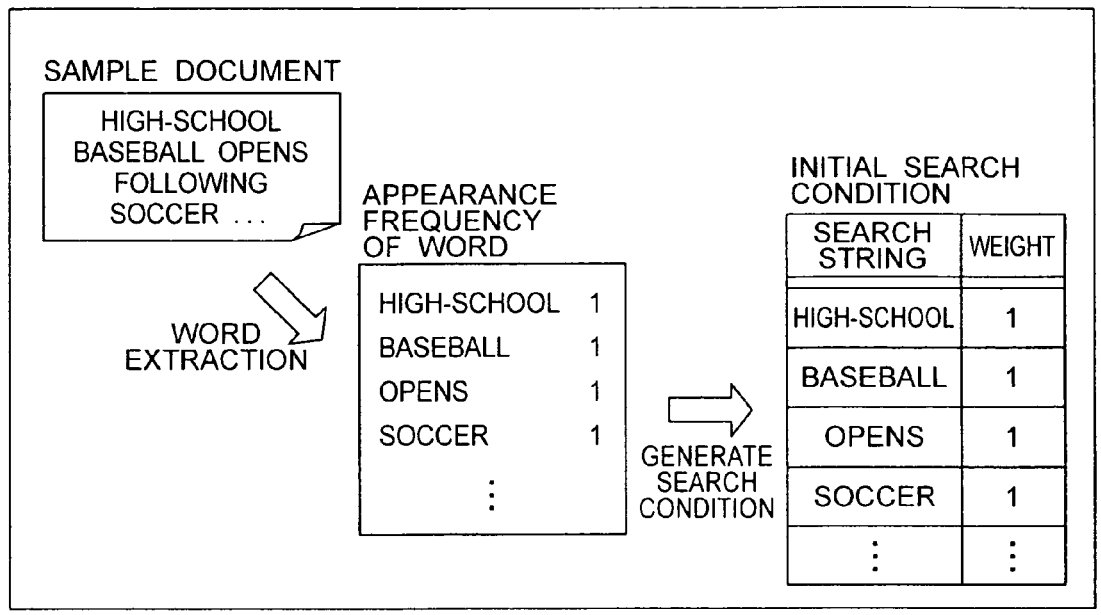
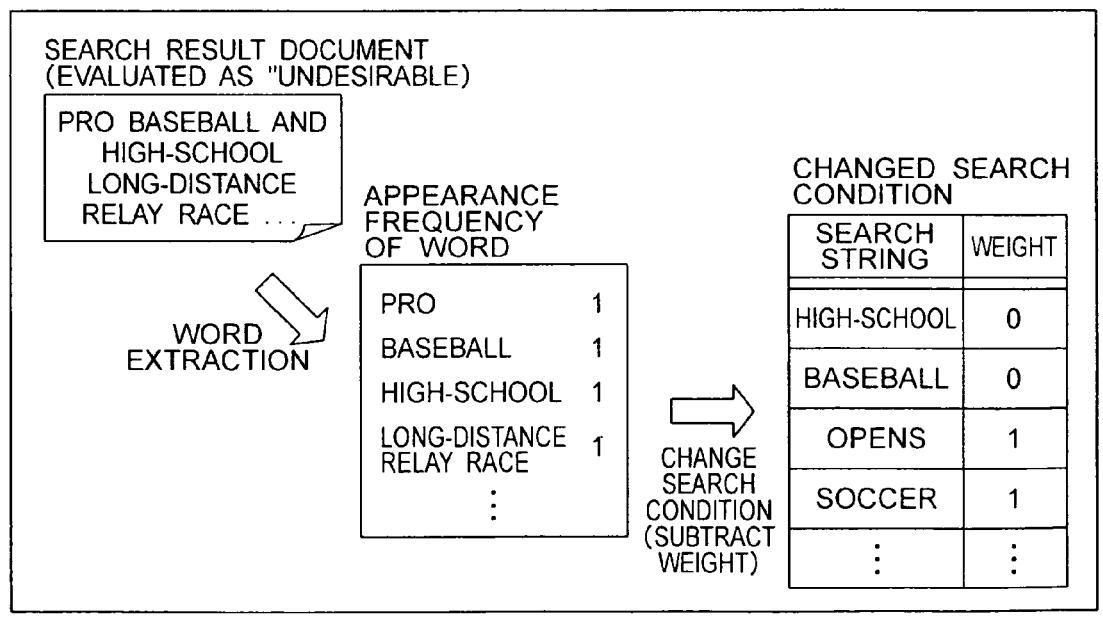

CONTINUED TO FIG. 19

METHOD AND SYSTEM FOR RETRIEVING A DOCUMENT AND COMPUTER READABLE STORAGE MEDIUM

This is a continuation application of U.S. Ser. No. 09/648,766, filed Aug. 28, 2000 now abandoned.

BACKGROUND OF THE INVENTION

The present invention relates to method and system for retrieving a document on the basis of a search condition designated by a user and a storage medium storing a processing program for use in the method and system and more particularly, to a retrieval technique in which the user evaluates a document obtained as a result of retrieval and the evaluation is reflected on the search condition.

With the widespread use of personal computers, Internet and the like, the number of electronic documents has been increasing drastically. Under the circumstances, a demand for retrieving a document containing information desired by a user at a high speed and with high efficiency has been increasing.

There is available a technique called relevance feedback as a retrieval technique meeting the demand as above. In this technique, for a search result based on a whole passage search or similar document search, the user inputs an evaluation "the document is desirable" or "the document is undesirable" to the system so that the evaluation information may be reflected to modify the search condition so as to improve the succeeding search results.

Specifically, a process method is shown in, for example, "Information Retrieval" by William B. Frakes/Rocardo Baeza-Yates, Prentice Hall PTR, 1992 pp.241–263, according to which weights in a search condition for words extracted from a document that has been evaluated as desirable by the user add and weights in a search condition for words extracted from a document that has been evaluated as undesirable subtract. Hereinafter, the above technique will be referred to as related art 1.

An example of a concrete method of addition/subtraction of weight applied to a certain word in a search condition is given by equation (1).

$$W' = W + \alpha \sum_{i}^{P} Fp(i) - \beta \sum_{j}^{N} Fn(j) \quad (1)$$

where W' represents a weight of the word after feedback has been carried out, W represents a weight of the word before the execution of feedback, Fp(i) represents the appearance frequency (times) of the word in an i-th document evaluated as desirable, and Fn(j) represents the appearance frequency of the word in a j-th document evaluated as undesirable. In the equation, P is the number of documents evaluated as desirable, N is the number of documents evaluated as undesirable, and α and β are parameters. The new weight W' can have a negative value and in such a case, similarity of the document containing the word decreases.

In the related art 1, however, there arises a problem to be described below. More particularly, the related art 1 employs a scheme in which one search condition changes with evaluations by the user, but the related art 1 does not disclose a means for saving a history of changes and a history of user's evaluations by making the correspondence between them. Consequently, once an evaluation made by the user is erased, it is impossible to return the search condition to that at a certain time.

In the relevance feedback, feedback is carried out by selecting a document to be evaluated from restricted documents contained in a set of search results and there is a possibility that the feedback does not always meet an intention of the user. In such an event, the search result is rather degraded by the feedback and it is necessary to erase an evaluation so as to recommence the relevance feedback and approach an intended search result through trial and error. Disadvantageously, it is essentially impossible for the related art 1 to meet the requirements as above.

This will be exemplified by making reference to FIG. 2. The figure shows an instance where a user, who retrieves a document concerning "high-school baseball", specifies a sample document "A high-school baseball opens following soccer - - - " and performs a similar document search. At that time, strings such as "high-school", "baseball", "soccer" and "opens" are extracted from the sample document and applied with weights to generate a search condition. Then, on the basis of the search condition, scores of individual documents in a database are calculated and a similar document that keeps scores satisfying a predetermined condition is delivered as a similar document search result.

An instance will now be considered in which of documents delivered as search result documents, a document "A professional baseball and a high-school long-distance relay race - - - " is evaluated as "undesirable" by the user. At that time, strings such as "professional", "baseball", "high-school" and "long-distance relay race" are extracted from the document evaluated as "undesirable" and weights of these strings in the search condition subtract, with the result that a document concerning "high-school baseball" cannot thereafter be obtained.

In such an event, the related art 1 does not save a search condition before the document "A professional baseball and a high-school long-distance relay race - - - " is evaluated as undesirable and consequently, a search condition cannot be returned to that before changing (that is, the search condition before changing cannot be restored) by erasing the evaluation. Accordingly, for example, there arises a problem that when the relevance feedback has been repeated and then an impertinent evaluation is inadvertently inputted, the erroneous evaluation cannot be corrected unless re-designating the initial sample document is recommenced by clearing all the search conditions.

Further, once the search result is degraded owing to changing of search condition, the search condition before the feedback cannot be restored and as a result, a desired document cannot be obtained as a search result. Consequently, a failure to consult the contents arises and in addition, the relevance feedback is carried out such that the document is evaluated as "desirable", giving rise to a problem that the search result cannot be improved purposively.

SUMMARY OF THE INVENTION

An object of the present invention is to realize improvements in the retrieval accuracy by making it possible to recommence evaluation for a desired search result document.

According to the present invention, in a document retrieval method in which a user inputs an evaluation for evaluating a search result document based on a designated search condition as desirable or undesirable and the search condition is changed on the basis of the evaluation, when changing the search condition on the basis of the evaluation, a search condition available immediately before or after the change is saved. A search result based on the search condition preceding or succeeding the change is saved further, some or all of information saved in the search condition saving step, information stored in the search result saving step, the above evaluation and an identifier of a document subjected to the evaluation are saved by making the correspondence between them.

With this construction, in a document retrieval method having the relevance feedback function, an evaluation for a desired search result document can be recommenced, thus realizing improvements in the accuracy of retrieval effected through the trial and error relevance feedback.

To accomplish the above object, there is provided a program for implementing the aforementioned function or a recording medium storing the program.

BRIEF DESCRIPTION OF THE DRAWINGS

FIG. 2 is a diagram showing an example of a relevance feedback process representing a related art.

DESCRIPTION OF THE EMBODIMENTS

An embodiment of the present invention will now be described.

In the present embodiment, retrieval is carried out on the basis of data (hereinafter referred to as searching profile) holding elements indicative of the contents a user desires in a similar document retrieval system having the relevance feedback function. A history of evaluations for search result documents inputted by the user, a history of searching profiles changed with the evaluations and a history of search results based on the changed searching profiles are all managed by making the correspondence of them with each other. Through this, a desired evaluation designated by the user can be recommenced so that the searching profile can be returned to a searching profile at a desired time. As a result, a search result document based on the returned searching profile can be presented and an evaluation for the search result document can be recommenced. In other words, improvements in accuracy of retrieval based on trail and error relevance feedback can be realized.

The present embodiment of the invention will now be described in greater detail with reference to the accompanying drawings.

Figure 1:
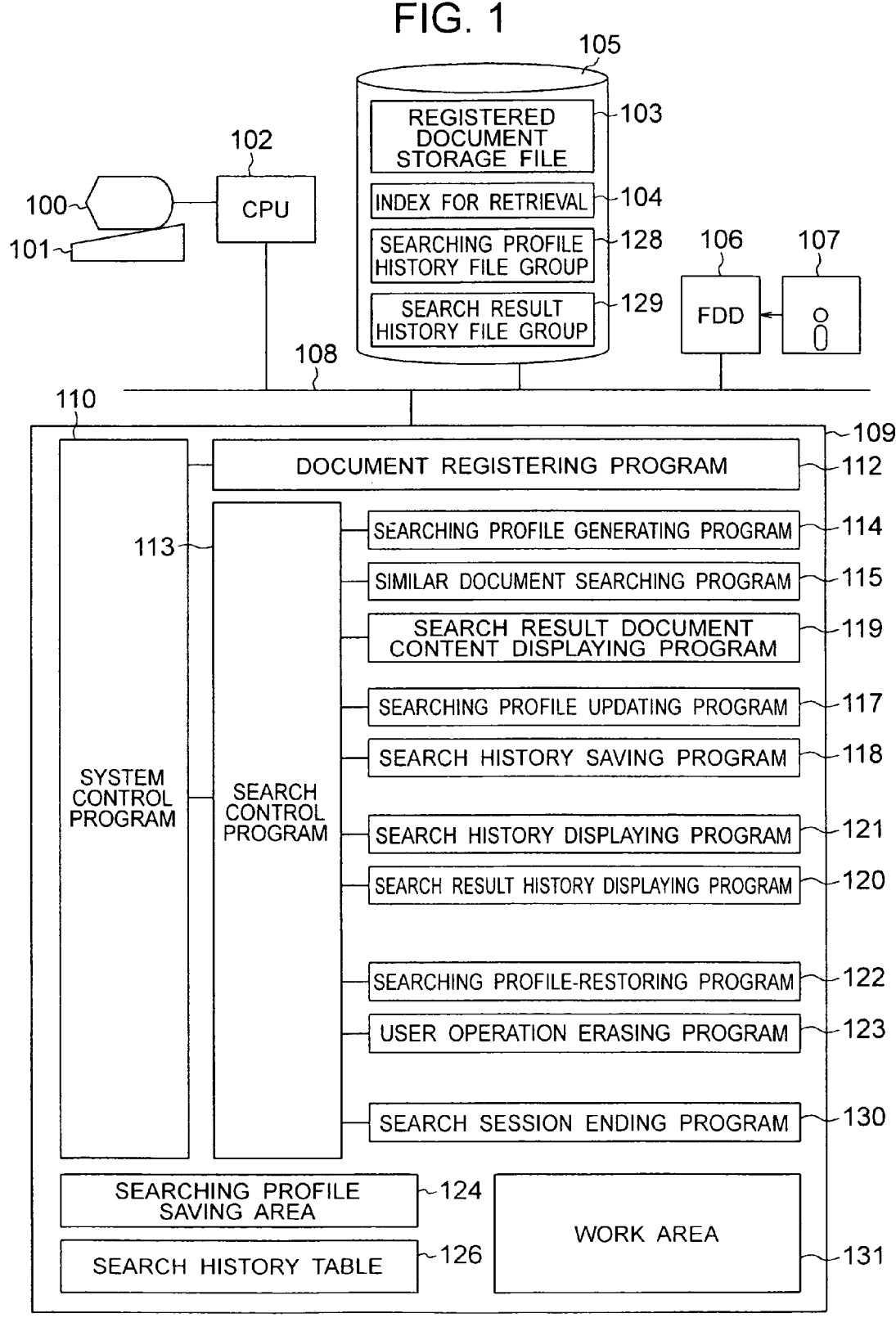
FIG. 1 is a diagram showing the construction of an embodiment of the invention.

Referring first to FIG. 1, a system according to the present embodiment is constructed as illustrated therein.

The system of the present embodiment comprises a display 100, a keyboard 101, a central processing unit (CPU) 102, a magnetic disc unit 105, a floppy disc drive (FDD) 106, a main memory 109 and a bus 108 for coupling these components.

The magnetic disc unit 105 is one of secondary storage units and houses a registered document storage file 103, an index for retrieval 104, a searching profile history file group 128, and a search result history file group 129. The main memory 109 or the magnetic disc unit 105 reads information stored in a floppy disc 107 through the FDD 106.

The index for retrieval 104 is a file that saves information indicating what sort of character or string in each document stored in the registered document storage file 103 appears at which position in each document. During retrieval, information as to which position in what sort of document a string appears at can be extracted at a high speed by making reference to this index.

As will be described later, the searching-profile history file group 128 is a set of files each saving a searching profile each time that a searching profile is updated when the user inputs an evaluation for a search result.

As will be described later, the search result history file group 129 is a set of files each saving a search result presented to the user each time that retrieval is carried out.

Stored in the main memory 109 are a system control program 110, a document registering program 112 and a search control program 113. The search control program 113 includes a searching profile generating program 114, a similar document searching program 115, a search result document content displaying program 119, a searching profile updating program 117, a search history saving program 118, a search history displaying program 121, a search result history-displaying program 120, a searching profile restoring program 122, a user operation erasing program 123 and a search session ending program 130.

The "user operation" termed herein is an operation conducted by the user for the purpose of modifying the searching profile, including inputting an evaluation for evaluating a search result document as either "desirable" or "undesirable" or recommencing the evaluation.

The main memory 109 also holds a searching profile saving area 124, a search history table 126 and a work area 131.

Figure 16:
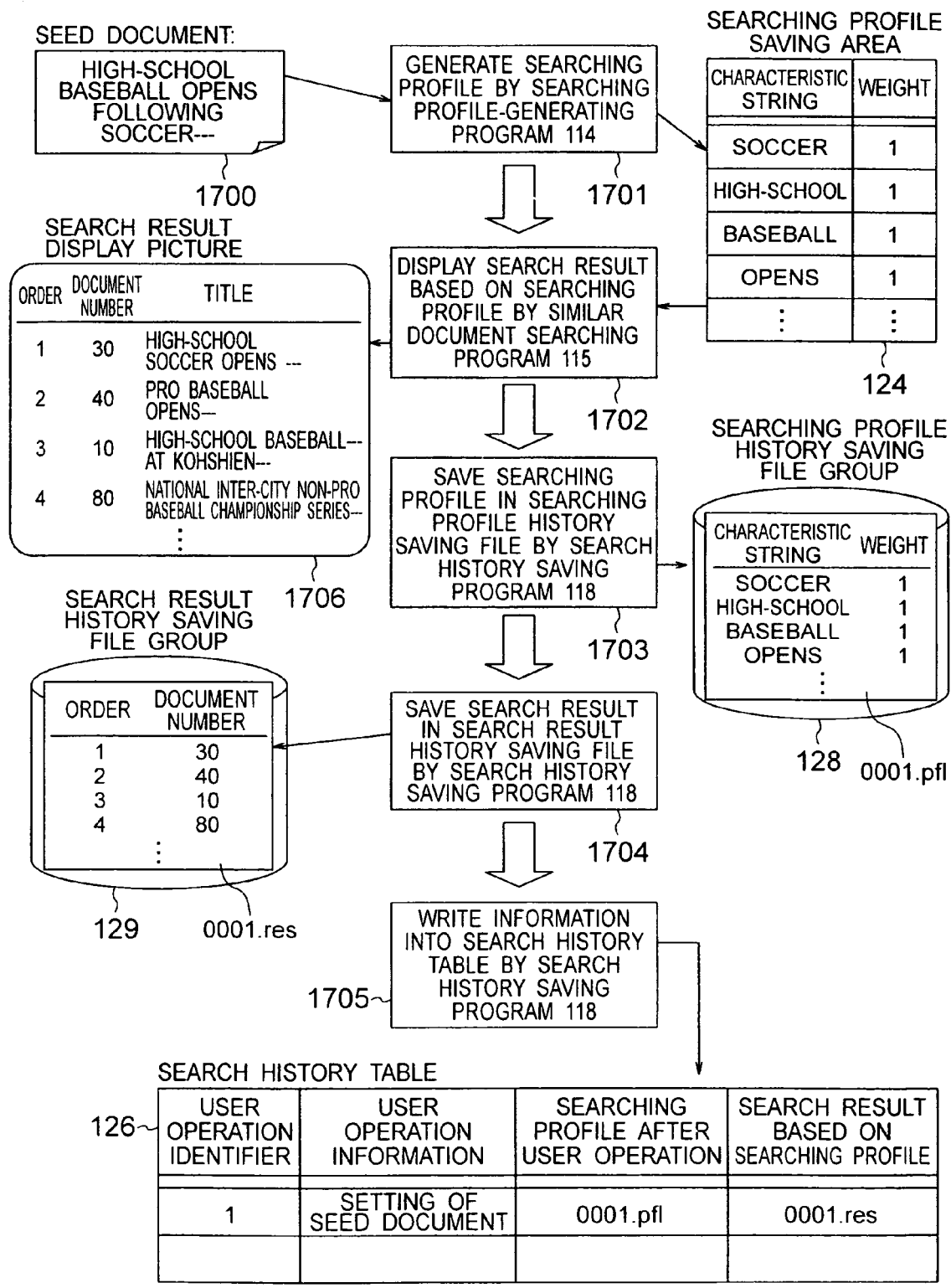
FIG. 16 is a diagram showing a concrete process flow in the case where when the user initially inputs a seed document as search condition, a searching profile is generated to conduct a similar document search in the embodiment of the invention.

The searching profile saving area 124 is an area for saving data for retrieval that holds contents desired by the user as elements as described previously. In the present embodiment, some search strings representing the contents desired by the user and their weights are held as shown in FIG. 16 to be described later.

The search history table 126 is a table for saving a user operation history by making the correspondence of a searching profile updated by the user operation with a search result based on the searching profile.

Processing procedures in the individual programs in the present embodiment will now be described.

Figure 3:
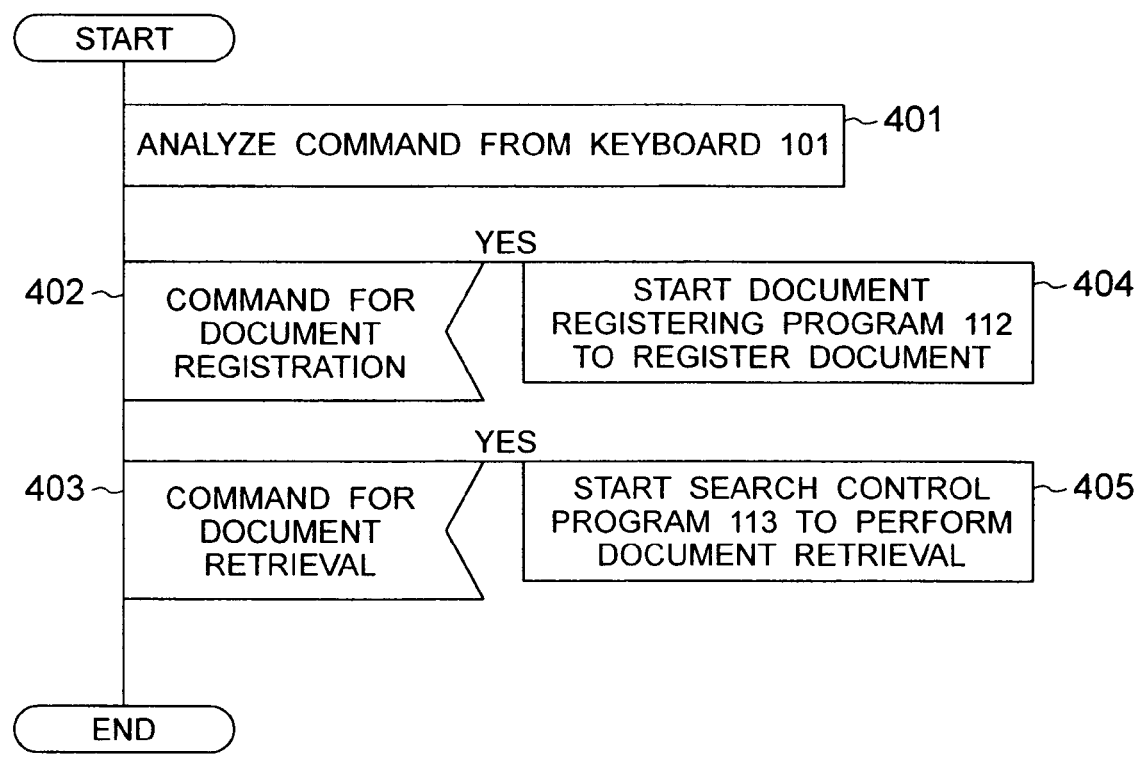
FIG. 3 is a PAD showing a processing procedure in a system control program 110 in the embodiment of the invention.

Firstly, a processing procedure in the system control program 110 will be described by making reference to a PAD (problem analysis diagram) of FIG. 3.

The system control program 110 first analyzes, in step 401, a command inputted by the user through the keyboard 101.

Next, when the command analyzed in the step 401 is determined to be a command of document registration in step 402, the document registering program 112 is started in step 404 to register a document.

When the analyzed command is determined to be a command of search execution in step 403, the search control program 113 is started in step 405 to retrieve a document.

The processing procedure in the system control program 110 is carried out as described above.

Figure 4:
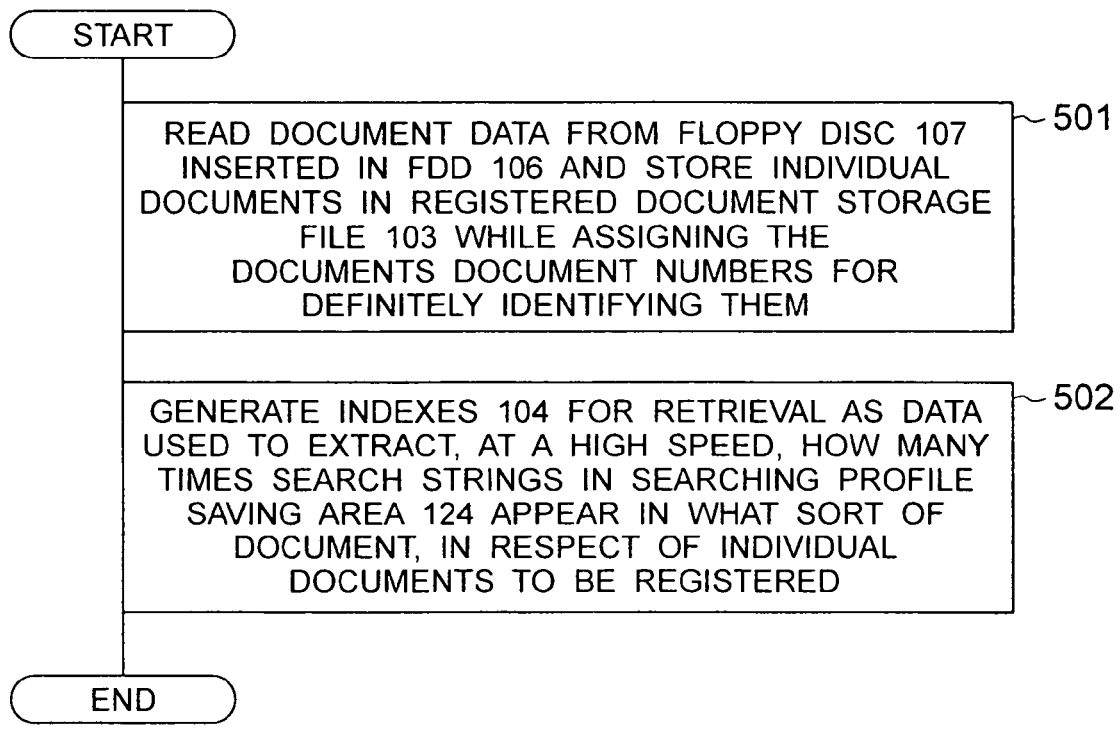
FIG. 4 is a PAD showing a processing procedure in a document-registering program 112 in the embodiment of the invention.

Next, the document-registering program started by the system control program 110 in the step 404 shown in FIG. 3 will be described by making reference to a PAD of FIG. 4.

In step 501, the document-registering program 112 first reads data of a document to be registered from the floppy disc 107 inserted in the FDD 106 and saves the readout document data in the registered document storage file 103 while assigning a document number for definitely identifying each document to the readout data. In an alternative, document data described as being inputted by using the floppy disc 107 may be inputted in a different way using, for example, a communication line or a CD-ROM unit (not shown in FIG. 1).

Subsequently, in step 502, index for retrieval 104 serving as data for high-speed extraction of how many times a search string in the searching profile saving area 124 appears in what sort of document is generated in respect of individual documents to be registered.

The index for retrieval 104 holds information as to which position of a registered document a character or a string appearing in the registered document appears at. For generation of the index for retrieval 104, a method as disclosed in "JP-A-64-35627" for simply extracting a string of n successive characters (n being a predetermined arbitrary value) or a different method using learning data based on neural network might be used. During retrieval, information indicating which position of what sort of document a string appears at can be extracted at a high speed by consulting this index.

The processing procedure in the document-registering program 112 is carried out as described above.

Next, a processing procedure in the search control program 113 started by the system control program 110 in the step 405 shown in FIG. 3 will be described by using a PAD of FIG. 5.

This program is to control a relevance feedback process, in which a searching profile is modified on the basis of information inputted by the user and retrieval is repeated until the user requests a search session to be ended.

Firstly, in step 601, the search control program 113 starts the searching profile generating program 114 to generate a searching profile on the basis of a sample document (hereinafter referred to as seed document) inputted as a search condition by the user and expressing the contents desired by the user.

Next, in step 681, the similar document-searching program 115 is started to perform a document search on the basis of the searching profile generated in the step 601 and display a search result.

Thereafter, in step 682, the search history saving program 118 is started by inputting user operation information "the seed document is set", and the searching profile and the search result are saved in a file of the searching profile saving file group 128 and a file of the search result history saving file group 129, respectively. The user operation information referred to herein is a string expressing the content of a user operation such as "the seed document is set" or "a document of document number 10 is evaluated as desirable". Through the present step, the searching profile at present and the search result based on the searching profile are saved. Further, the searching profile at present, the search result based on the searching profile and the user operation information "the seed document is set" are all registered as initial information in the search history table 126 by making the correspondence between them. The concrete contents of data saved in the search history table 126 will be described later with reference to FIG. 16.

Next, in step 602, processes in steps 603 through 618 are repeated until the search session ending program 130 is executed in step the step 618.

In the repetitive process, a command inputted from the keyboard 101 is first analyzed in the step 603.

Next, in the step 605, when the command is determined to be a command to display the content of the search result document, the search result document content displaying program 119 is started in the step 611 to display the content of a designated search result document is displayed.

Subsequently, when the command is determined to be a command to input a user's evaluation for the search result document in the step 606, the searching profile updating program 116 is started in step 651 to generate user operation information on the basis of the evaluation inputted by the user and change the content of the searching profile saving area 124. Further, in step 652, the similar document-searching program 115 is started to perform document search on the basis of the content of the searching profile changed in the step 651 and display a search result. Furthermore, in step 653, the search history saving program 118 is started by using the user operation information generated in the step 651 as an input to save, in the search history table 126, the searching profile changed in the step 651 and the search result obtained in the step 652 by making the correspondence of them with the user operation information.

Through the steps 651 to 653, the searching profile is updated on the basis of the user's evaluation for the search result document and the evaluation, the updated searching profile and the search result based on the updated searching profile are saved in the search history table 126 by making the correspondence between them.

Subsequently, when the command is determined to be a command to display a search history in the step 608, the search history displaying program 121 is started in the step 614 to display a history of user operations following the initial seed document setting in a tabulated form.

Thereafter, in the step 607, when the command is determined to be a command to display a search result history, the search result history displaying program 120 is started in the step 613 to display search results obtained by user operations following the initial seed document setting in a tabulated form.

Next, in the step 609, when the command is determined to be a command to restore a searching profile, the searching profile restoring program 122 is started in step 661. In the restoration of the searching profile, with the aim of recommencing the user action from a desired past time, the content of a searching profile is returned to that at a designated time. In the present step, user operation information is generated on the basis of a request for restoration inputted by the user and besides, the content of the searching profile saving area 124 at the requested time is restored and a similar document search result based on the restored searching profile is displayed. Further, in step 663, the search history saving program 118 is started by using an input of the user operation information generated in the step 661 to save, in the search history table 126, the searching profile changed in the step 661 and the search result obtained in the step 661 by making the correspondence of them with the user operation information.

Through the steps 661 and 663, the searching profile is updated on the basis of the request for restoring the searching profile made by the user and the request, the updated searching profile and the search result based on the searching profile are saved in the search history table 126 by making the correspondence between them.

Next, when the command is determined to be a command to erase the user operation in the step 610, the user operation-erasing program 123 is started in step 671. In the erase of user operation, the content of searching profile is changed to that at the time that only designated one of the past user operations conducted by the user might not carried out. In the present step, user operation information is generated on the basis of a request for erase inputted by the user and besides, the content of the searching profile saved in the searching profile saving area 124 is changed to that of the searching profile obtained when the designated evaluation is not carried out. Further, in step 672, the similar document search program 115 is started to carry out document search on the basis of the content of searching profile changed in the step 671 and display a search result. Further, in step 673, the search history saving program 118 is started by using an input of the user operation information generated in the step 671 to save the searching profile changed in the step 671 and the search result obtained in the step 672 by making the correspondence of them with the user operation information.

Through the steps 671 to 673, the searching profile is updated on the basis of the request for erasing evaluation made by the user and the request, the updated searching profile and the search result based on the searching profile are saved in the search history table 126 by making the correspondence between them.

Next, in the step 617, when the command is determined to be a command to end a search session, the search session ending program 130 is started in the step 618 to end the search session. In this step, the searching profile and the search history are all cleared.

In this phase, the content of the searching profile saving area 124 may be saved before cleared, so that it can be reutilized in the next and ensuing search sessions.

The processing procedure in the search control program 113 is carried out as described above.

Next, a processing procedure in the searching profile generating program 114 started by the search control program 113 in the step 601 shown in FIG. 5 will be described by using a PAD of FIG. 6.

In case the user inputs a seed document in the initial phase, the present program generates a searching profile on the basis of the seed document.

Firstly, in step 701, the searching profile generating program 114 reads a seed document inputted from the keyboard 101 and stores the readout seed document in the work area 131.

Subsequently, in step 702, strings each having a possibility of being an independent word (hereinafter referred to as characteristic strings) are extracted from the seed document stored in the work area 131 and a frequency (the number of times) of appearance of each characteristic string in the seed document is calculated as a weight used for similar document search.

Thereafter, in step 703, the characteristic stings extracted in the step 702 and their weights are written in the searching profile saving area 124.

Information now prepared in the searching profile saving area 124 is used when similarity of individual documents stored in the registered document storage file 103 to the seed document is calculated in the similar document searching program as will be described later. While, in this phase, the frequency of appearance in the seed document is calculated as weight in the step 702, the weight may be calculated in a different way, for example, by performing such calculation that the smaller the number of documents in registered document storage file 103 in which the individual characteristic strings appear, the higher the weight becomes.

Further, in this phase, all extracted characteristic stings may be handled as stings to be written in the searching profile saving area 124 or a limited number of extracted characteristic strings having higher frequencies of appearance in the seed document may be selected in order of their frequencies.

For the extraction of characteristic strings, a method that is disclosed in "JP-A-11-143902", a method for extracting words in each document by using morphological analysis or other methods may be employed.

The processing procedure in the searching profile generating program is carried out as described above.

Figure 7:
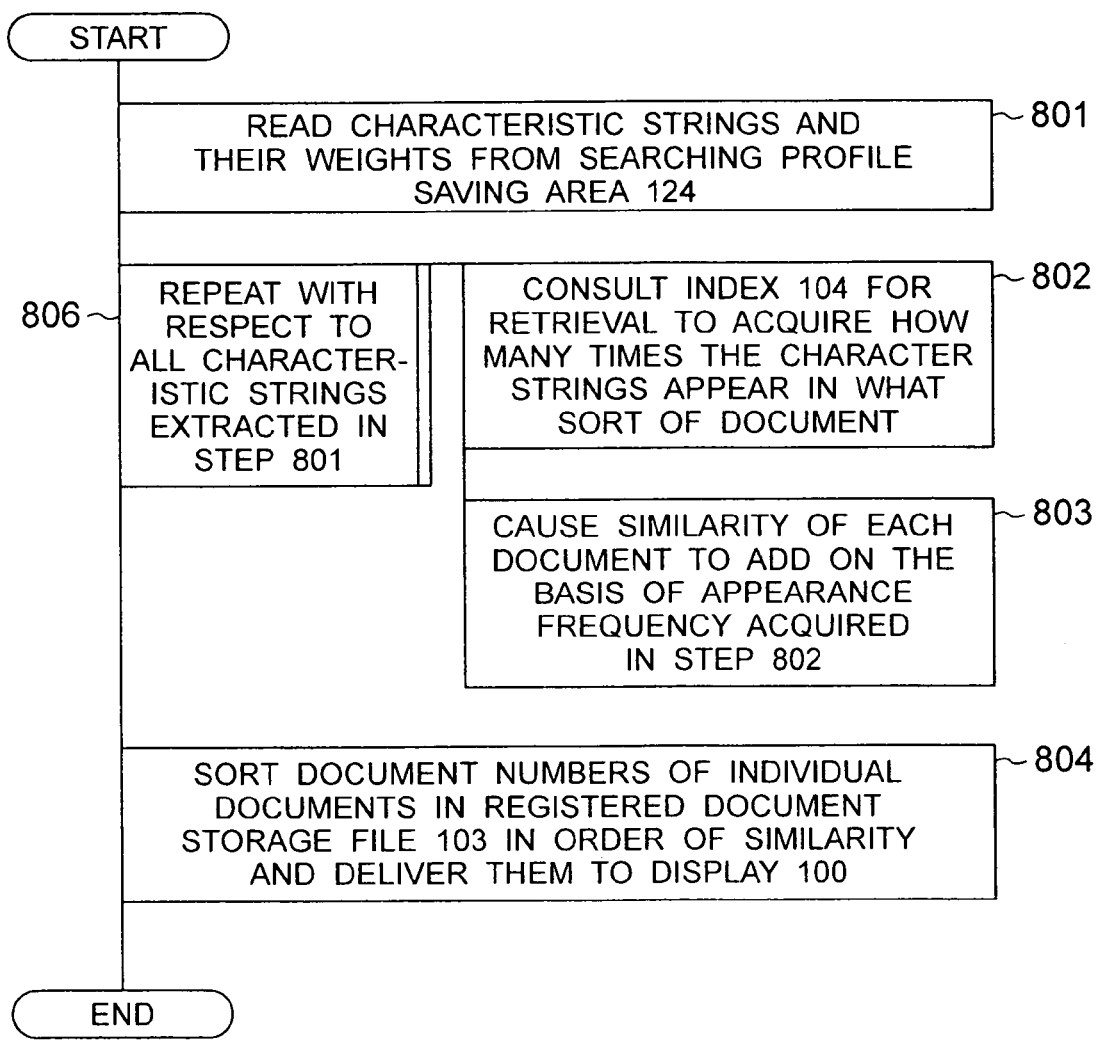
FIG. 7 is a PAD showing a processing procedure in a similar document-searching program 115 in the embodiment of the invention.

Next, a processing procedure in the similar document searching program 115 started by the search control program 113 in the step 681, 652 or 672 shown in FIG. 5 will be described with reference to a PAD of FIG. 7.

In the present program, a score conforming to conceptive similarity to a designated seed document is given to individual registered documents and a document having high similarity is displayed as a search result.

Figure 6:
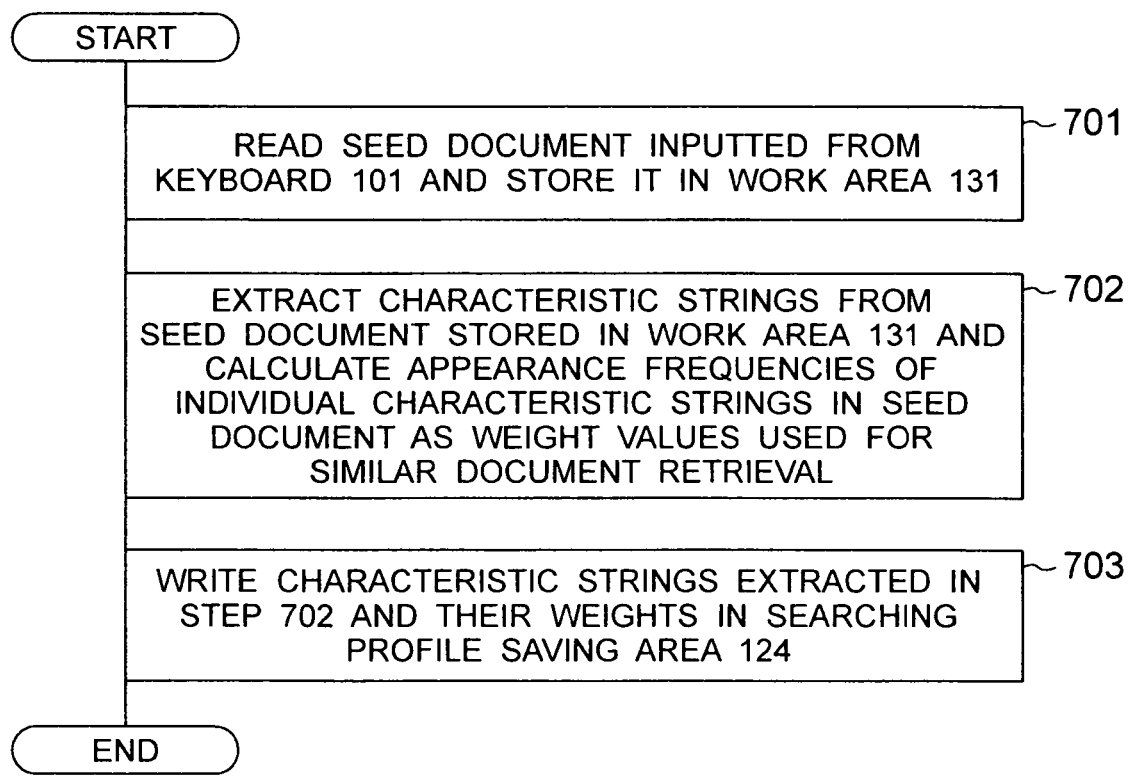
FIG. 6 is a PAD showing a processing procedure in a searching profile generating program 114 in the embodiment of the invention.

Firstly, in step 801, the similar document-searching program 115 reads the characteristic strings and their weights saved in the searching profile saving area 124 by the searching profile generating program 114 in the step 702 shown in FIG. 6.

Next, in step 806, processes in steps 802 and 803 are repeated for all characteristic strings extracted in the step 801.

In the repetitive process, the index for retrieval 104 is first consulted in the step 802 to acquire how many times the strings appear in what sort of document.

Subsequently, in the step 803, similarity of each document adds on the basis of the appearance frequency obtained in the step 802. As a calculation expression for calculating similarity adding in each document through the repetitive process, equation (2) as below, for example, is used.

$$S(D) = \sum_{i}^{N} \{Frq(i) \times W(i)\} \quad (2)$$

where S(D) represents similarity of a document number D in the registered document storage file 103, Frq(i) represents the appearance frequency of a word i in the document number D and w(i) represents a weight of the word i in the searching profile saving area 124. Obviously, another similarity calculation expression may be used.

Thereafter, in step 804, document numbers of the individual documents in the registered document storage file 103 are sorted in a descending order of similarity and then delivered to the display 100. In this phase, only predetermined document numbers of higher similarity may be delivered sequentially in a descending order from high to low or only document numbers of higher similarity than a predetermined level of similarity may be delivered. If the document has an attribute such as title, the attribute may be delivered.

The processing procedure in the similar document-searching program 115 is carried out as described above.

Figure 8:
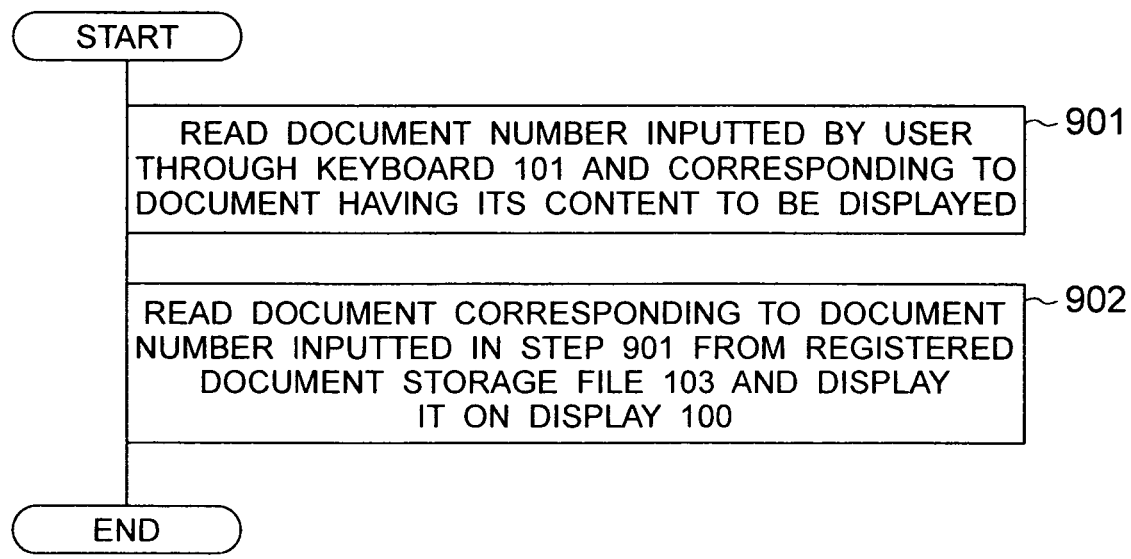
FIG. 8 is a PAD showing a processing procedure in a search result document content displaying program 119 in the embodiment of the invention.

Referring now to a PAD of FIG. 8, a processing procedure in the search result document content displaying program 119 started by the search control program 113 in the step 611 shown in FIG. 5 will be described.

The present program is to display the contents of a document designated by the user on the display 100.

Firstly, in step 901, the search result document content displaying program 119 reads a document number inputted by the user through the keyboard 101 and corresponding to a document having its contents to be displayed.

Next, in step 902, the document corresponding to the document number inputted in the step 901 is read out of the registered document storage file 103 and displayed on the display 100. At that time, of strings in the document to be displayed, characteristic strings stored in the searching profile saving area may be displayed with emphasis in a color different from that of other strings.

The processing procedure in the search result document content displaying program 119 is carried out as described above.

Figure 9:
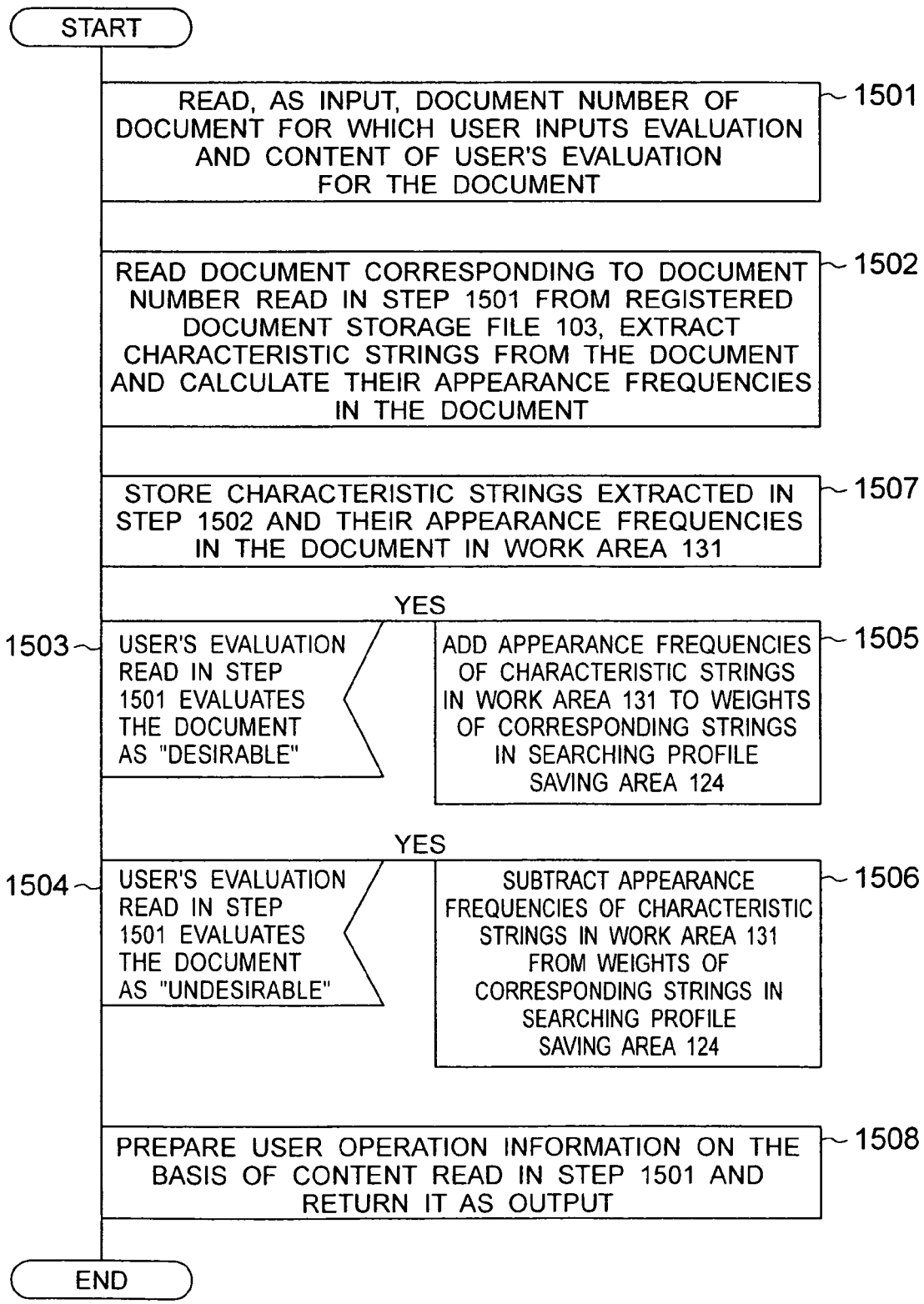
FIG. 9 is a PAD showing a processing procedure in a searching profile updating program 117 in the embodiment of the invention.

Referring now to a PAD of FIG. 9, a processing procedure in the searching profile updating program 117 started by the search control program 113 in the step 651 shown in FIG. 5 will be described.

When a user's evaluation for a search result document is inputted, the present program feeds back the evaluation to change the content of a searching profile.

Firstly, in step 1501, the searching profile updating program 117 reads, as an input, a document number of a document for which the user has inputted an evaluation and the content of evaluation for evaluating the document as "desirable" or "undesirable".

Subsequently, in step 1502, the document corresponding to the document number read in the step 1501 is read out of the registered document storage file 103 and then, characteristic strings are extracted from the document and the frequencies of their appearance in the document are calculated.

Thereafter, in step 1507, the characteristic strings extracted in the step 1502 and the frequencies of their appearance in the document are stored in the work area 131.

Then, when the user's evaluation read in the step 1501 is determined to be "desirable" in step 1503, the appearance frequencies of individual characteristic strings stored in the work area 131 are added to weights of the strings in the searching profile saving area 124 in step 1505. At that time, if the strings do not exist in the searching profile saving area 124, these strings are added to the searching profile saving area 124 and the appearance frequencies read in the step 1502 are assigned as weights.

Next, when the user's evaluation read in the step 1501 is determined to be "undesirable" in step 1504, the appearance frequencies of individual characteristic strings stored in the work area 131 are subtracted from weights of the strings in the searching profile saving 124 in step 1506. At that time, if the strings do not exist in the searching profile saving area 124, these strings are added to the searching profile saving area 124 and negative values of the appearance frequencies read in the step 1502 are assigned as weights.

Next, in step 1508, user operation information is prepared on the basis of the content read in the step 1501 and delivered in return to the search control program 113 that has called the present program. The user operation information prepared herein has the contents "the document of document number 10 is evaluated as desirable", indicating that the user has inputted an evaluation for the search result document. The search history saving program 118 scheduled to be executed after completion of execution of the present program saves that information in the search history table 126 by making the correspondence of the information with the searching profile changed in the step 1505 or 1506 and the search result based on the searching profile.

In an alternative, for addition/subtraction of weight in the step 1505 or 1506, a method may be employed to define some grades in accordance with the degree of evaluation by the user. For example, when the user evaluates the document as "desirable", the appearance frequencies of the characteristic strings in the document, as they are, are added to weights of the strings in the searching profile saving area 124 but when the user evaluates the document as "somewhat desirable", half of the appearance frequencies of the characteristic strings in the document are added to weights of the strings in the searching profile saving area 124. Further, in the addition/subtraction of the characteristic strings to/from the weight in the steps 1505 and 1506, all of the characteristic strings extracted in the step 1502 may be involved or a limited number of characteristic strings having higher appearance frequencies in order may be involved.

The processing procedure in the searching profile updating program 117 is carried out as described above.

Figure 10:
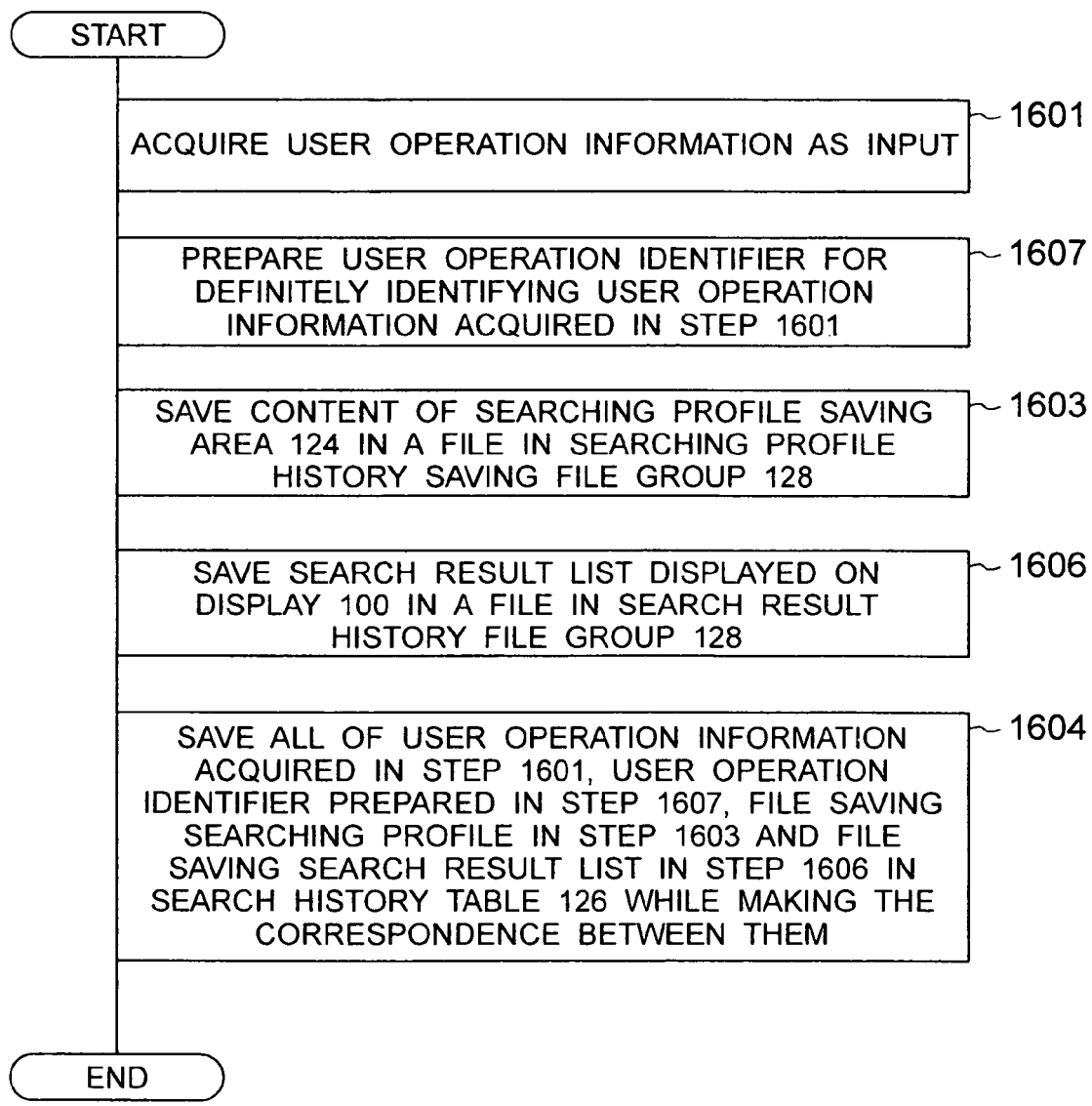
FIG. 10 is a PAD showing a processing procedure in a search history saving program 118 in the embodiment of the invention.

Referring now to a PAD of FIG. 10, a processing procedure in the search history saving program 118 started by the search control program 113 in the step 653, 663 or 673 will be described.

The present program is called after the content of a searching profile is updated by a user operation and retrieval is executed on the basis of an updated searching profile and is to save the content of the updated searching profile and a search result based on that searching profile by making the correspondence of them with the user operation.

Firstly, in step 1601, the search history saving program 118 acquires an input of user operation information. In other words, information as to what sort of operation has changed the searching profile is acquired.

Next, in step 1607, a user operation identifier for definitely identifying the user operation information acquired in the step 1601 is prepared.

Next, in step 1603, the content of the searching profile saving area 124 is saved in a file in the searching profile history saving file group 128.

Then, in step 1606, a list of search results displayed on the display 100 is saved in a file in the search result history file group 129.

Subsequently, in step 1604, the user operation information acquired in the step 1601, the user operation identifier prepared in the step 1607, the file used to save the searching profile in the step 1603 and the file used to save the search result list in the step 1606 are all saved in the search history table 126 by making the correspondence between them. The concrete contents of data saved in the search history table 126, the searching profile history saving file group 128 and the search result history file group 129 will be described later by making reference to FIG. 16.

The processing procedure in the search history saving program 118 is carried out as described above.

Figure 11:
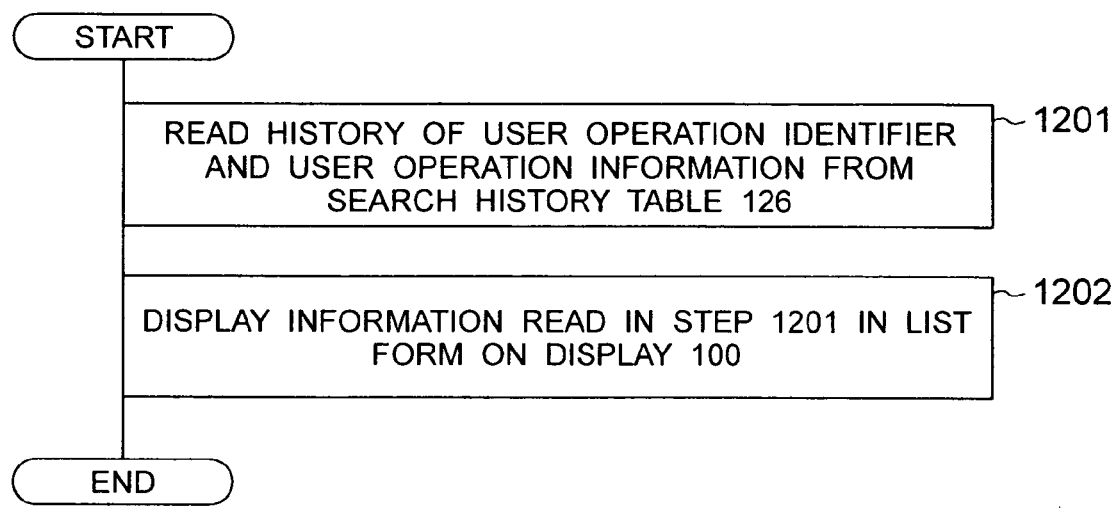
FIG. 11 is a PAD showing a processing procedure in a search history-displaying program 121 in the embodiment of the invention.
Figure 12:
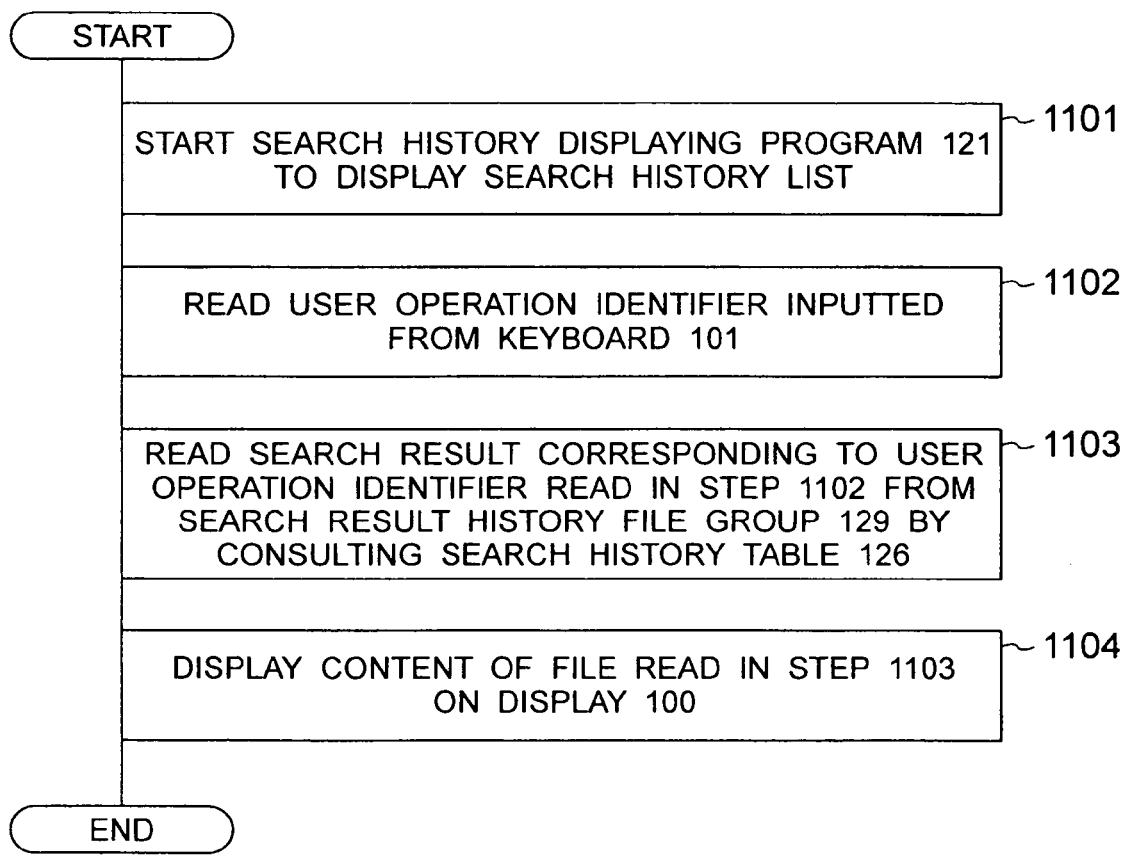
FIG. 12 is a PAD showing a processing procedure in a search result history-displaying program 120 in the embodiment of the invention.

Referring now to a PAD of FIG. 11, a processing procedure in the search history-displaying program 121 started by the search control program 113 in the step 614 shown in FIG. 5 will be described.

After initial setting of the seed document by the user, the user has carried out user operations including inputting an evaluation for a search result document, restoring a searching profile and erasing a user operation. The present program displays a history of these user operations in a tabulated form on the display 100. For example, when the user desires to erase a past operation or reacquire a search result obtained in the past, the user operation identifier used for designating what sort of operation is to be erased and a search result at what time is to be acquired is displayed together with the user operation information by means of the present program.

In step 1201, the retrieval history-displaying program 121 first reads a history of user operation identifier and user operation information from the search history table 126.

Next, in step 1202, the history of user operation identifier and user operation information read in the step 1201, that is, information as to which evaluation is made for what sort of document is displayed in a list form on the display 100. In this phase, if the document subject to the evaluation has an attribute such as title, then the attribute will be delivered concurrently.

The processing procedure in the search history-displaying program 121 is carried out as described above.

Referring now to a PAD of FIG. L2, a processing procedure in the search result history-displaying program 120 started by the search control program 113 in the step 613 shown in FIG. 5 will be described.

The present program is to acquire a search result immediately after completion of a designated one of user past operations.

Figure 18:
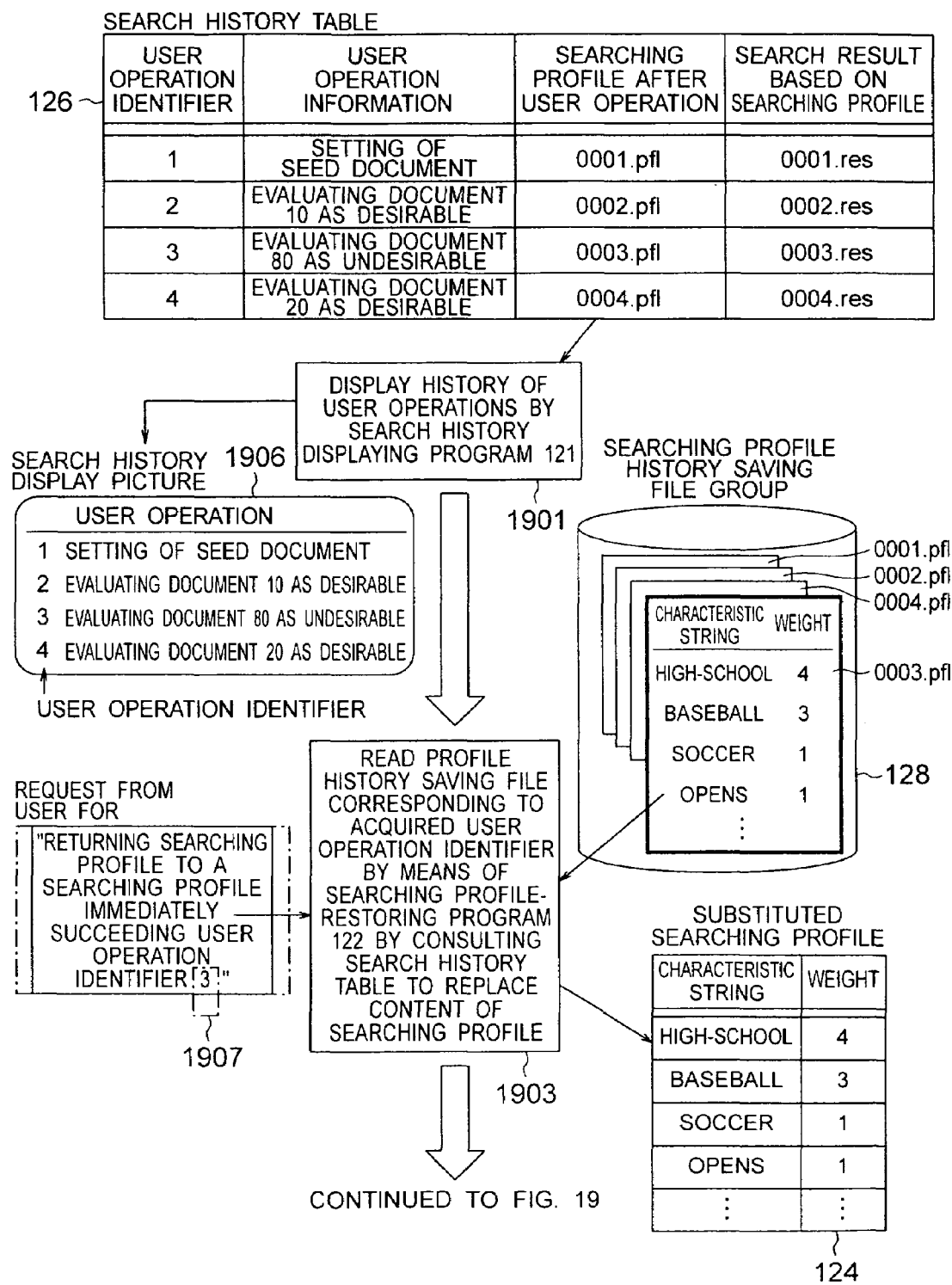
FIG. 18 is a diagram showing a process flow in the case where after the user has conducted the relevance feedback to change the searching profile, the content of a searching profile at a desired time is restored and a search result based on the restored searching profile is displayed to the user in the embodiment of the invention.

Firstly, in step 1101, the search result history-displaying program 120 starts the search history-displaying program 121 to display a search history. At that time, a list of user operations executed by the user is displayed together with user operation identifiers assigned to the operation, respectively, on the display 100 as shown in FIG. 18 to be described later.

Next, in step 1102, a user operation identifier inputted from the keyboard 101 is read. The user operation identifier inputted at that time corresponds to a user's desire for acquiring a search result immediately after or immediately succeeding a user operation corresponding to that user operation identifier.

Subsequently, in step 1103, a file name in search result history file group 129 that corresponds to the user operation identifier read in the step 1102 is read out of the search history table 126.

Thereafter, in step 1104, a list of search results written in the search result history file corresponding to the file name read in the step 1103 is read and displayed on the display 100.

The processing procedure in the search result history-displaying program 120 is carried out as described above.

Figure 13:
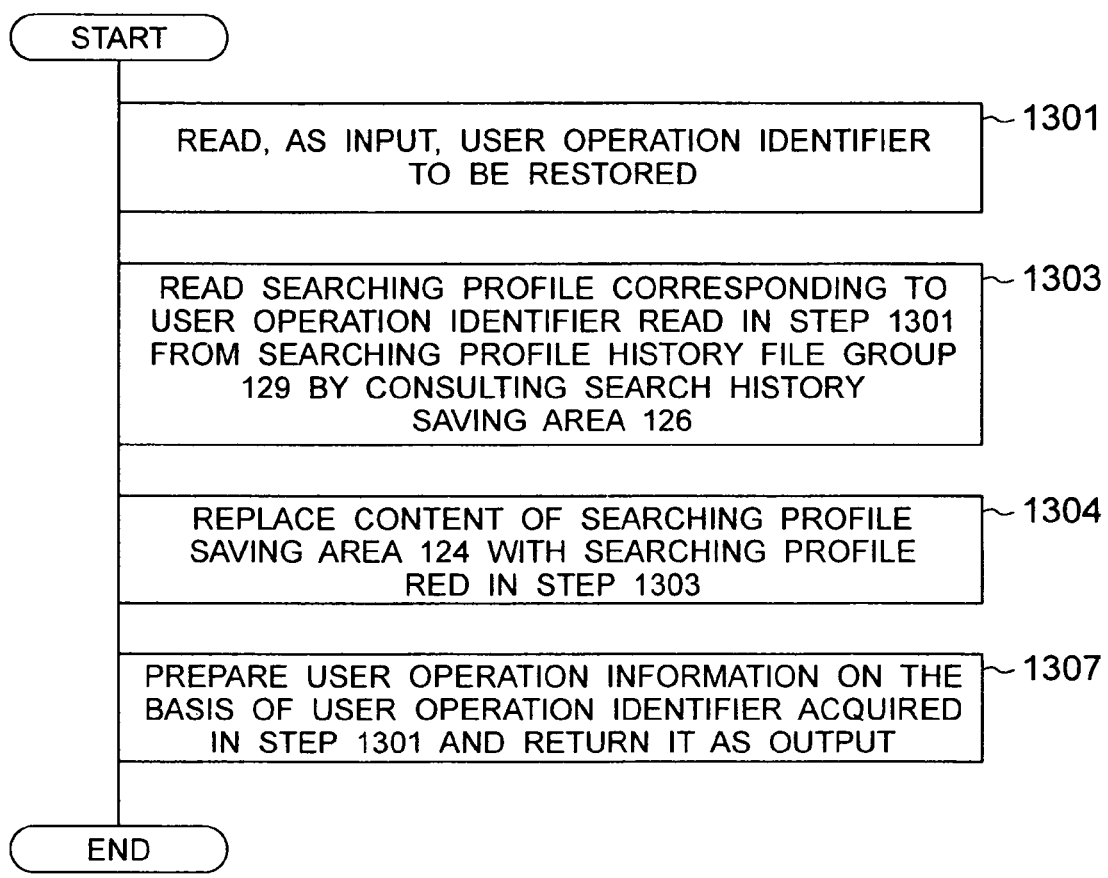
FIG. 13 is a PAD showing a processing procedure in a searching profile restoring program 122 in the embodiment of the invention.

Referring now to a PAD of FIG. 13, a processing procedure in the searching retrieval profile-restoring program 122 started by the search control program 113 in the step 661 shown in FIG. 5 will be described.

In the present program, the content of searching profile is replaced with the content immediately succeeding a designated user operation, so that a different user operation starting from a designated time can be performed, that is, relevance feedback can be recommenced.

Firstly, in step 1301, the searching profile-restoring program 122 reads an input of a user operation identifier subjected to restoration. For example, in case the user desires to replace the content of searching profile with the content immediately succeeding a user operation "the document of document number 10 is evaluated as desirable", a user operation identifier assigned to this user operation is inputted.

Next, in step 1303, the search history saving area 126 is consulted to read a searching profile corresponding to the user operation identifier read in the step 1301 from the searching profile history file group 129. Namely, the content of a searching profile immediately succeeding the content changed by the user operation corresponding to the user operation identifier read in the step 1301 can be obtained.

Subsequently, in step 1304, the content in the searching profile saving area 124 is replaced with the searching profile read in the step 1303.

Thereafter, in step 1307, user operation information is prepared on the basis of the user operation identifier obtained in the step 1301 and is returned, as an output, to the search control program 113 that has called the present program. The user operation information now prepared has the content "a searching profile immediately succeeding the user operation of user operation identifier 5 is desired to be restored", indicating that the user desires restoration of the searching profile. This information is saved in the search history table 126 while being caused to have the correspondence with the searching profile changed in the step 1304 and the search result based on that searching profile by means of the search history saving program scheduled to be executed after execution of the present program.

The processing procedure in the searching profile-restoring program 122 is carried out as described above.

Figure 5:
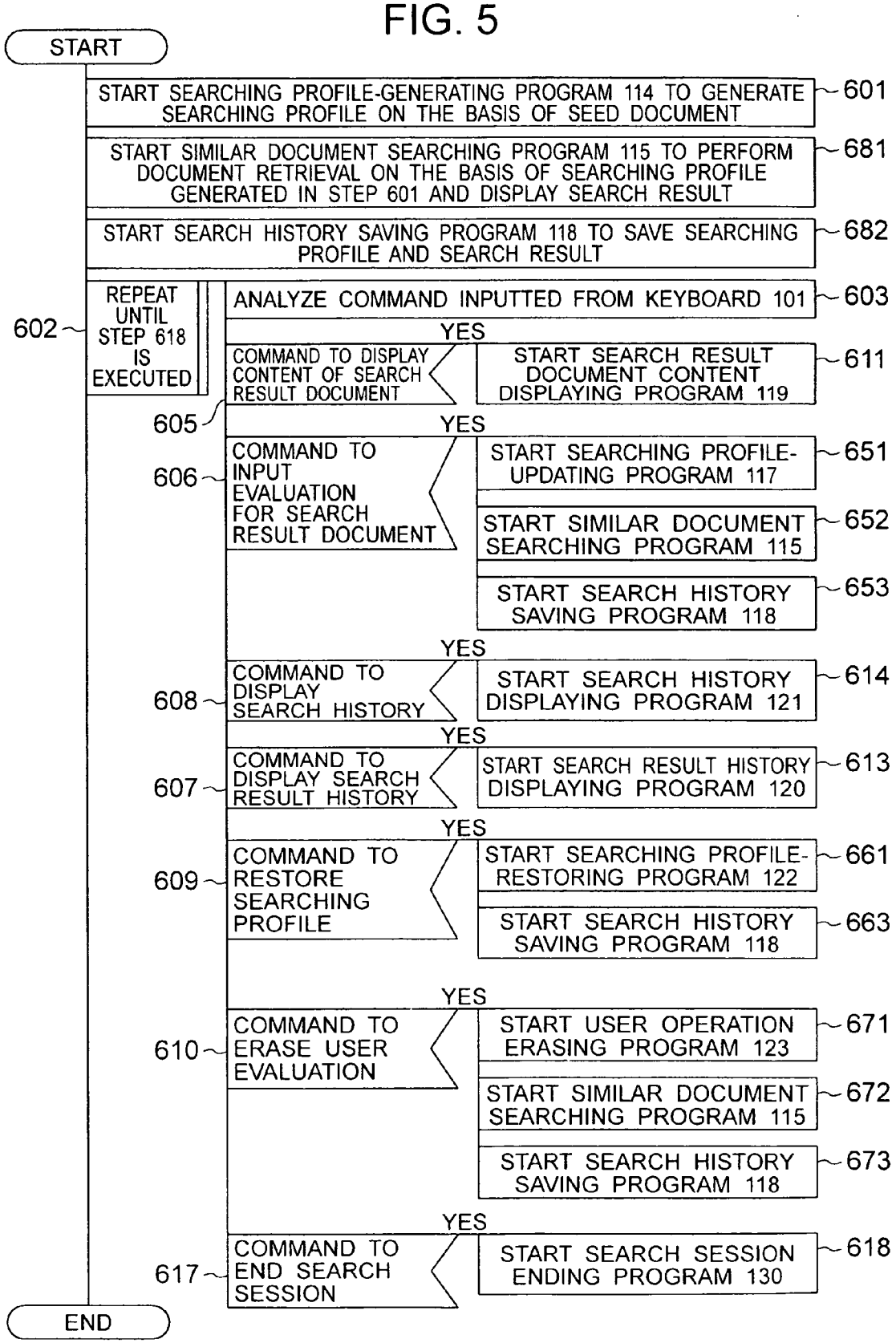
FIG. 5 is a PAD showing a processing procedure in a search control program 113 in the embodiment of the invention.
Figure 14:
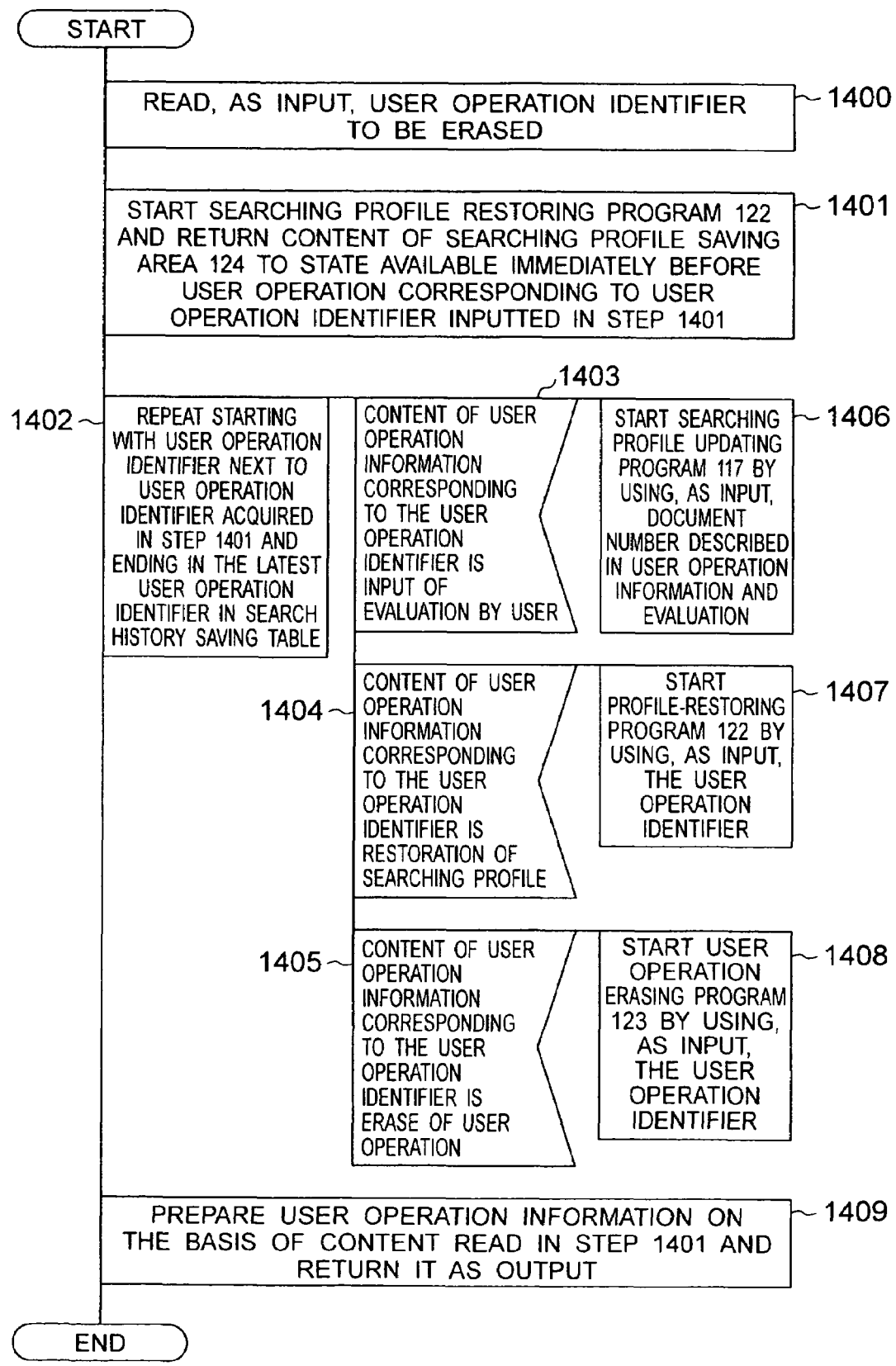
FIG. 14 is a PAD showing a processing procedure in a user operation-erasing program 123 in the embodiment of the invention.

Referring now to a PAD of FIG. 14, a processing procedure in the user operation-erasing program 123 started by the search control program 113 in the step 671 shown in FIG. 5.

The present program is to change the content of searching profile to the content available when only a designated one of user operations executed so far is not carried out.

Firstly, in step 1400, the user operation-erasing program reads, as an input, a user operation identifier corresponding to an operation subject to erasing.

Subsequently, in step 1401, a user operation identifier corresponding to a user operation that precedes, by one, a user operation corresponding to the user operation identifier read in the step 1400 is inputted and the searching profile restoring program 122 is started to restore the content of the searching profile saving area 124 immediately preceding the user operation corresponding to the user operation identifier read in the step 1400.

Next, in step 1402, processes in steps 1403 to 1408 are repeated for user operation identifiers ranging over the user operation identifier corresponding to the user operation performed next the user operation corresponding to the user operation identifier obtained in the step 1401 and the latest user operation identifier in the search history table 126.

In the repetitive process, when, in the step 1403, the content of the user operation information corresponding to the user operation identifier is first determined to be an input of an evaluation for the search result document, the searching profile updating program 117 is started in the step 1406 by using, as an input, a document number and an evaluation described in the user operation information.

Next, in the step 1404, when the content of the user operation information corresponding to the user operation identifier is determined to be restoration of searching profile, the searching profile restoring program 122 is started in the step 1407 by using an input of the user operation identifier.

Subsequently, in the step 1405, when the content of the user operation information corresponding to the user identifier is determined to be erase of user operation, the user operation-erasing program 123 is started in the step 1408 by using an input of the user operation identifier.

Through the above repetitive process, the searching profile is returned to the state immediately preceding the user operation designated by the user and thereafter, repetition starts with a user operation carried out next the user operation designated by the user. In this manner, all user operations excepting the user operation designated by the user can be reproduced. In other words, only the user operation designated by the user can be erased.

Next, user operation information is prepared on the basis of the content read in the step 1401 and is returned as an output to the search control program 113 that has called the present program. The user operation information now prepared has the content "the user operation of user operation identifier 5 is erased", indicating that the user has erased the user operation. This information is saved in the search history table 126 while being caused to have the correspondence with the searching profile changed in the repetitive process of the steps 1401 and 1402 and the search result based on the searching profile by means of the search history saving program scheduled to be executed after execution of the present program.

The above is the contents of the user operation-erasing program.

Figure 15:
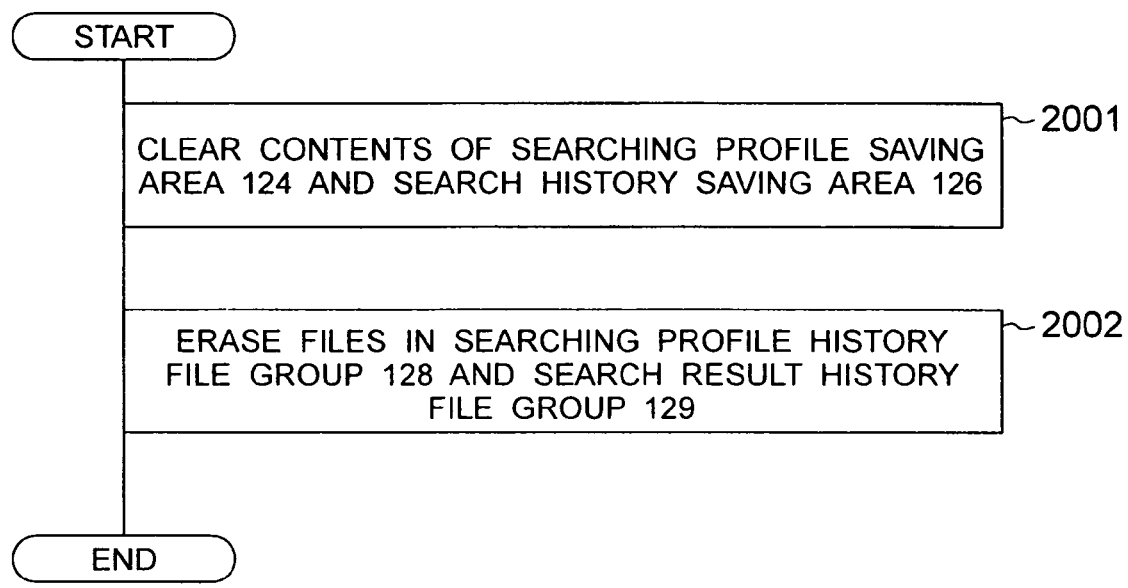
FIG. 15 is a PAD showing a processing procedure in a search session ending program 130 in the embodiment of the invention.

Referring now to a PAD of FIG. 15, a processing procedure in the search session ending program 130 started by the search control program 113 in the step 618 shown in FIG. 5 will be described.

Firstly, in step 2001, the search session ending program 130 clears the contents of the searching profile saving area 124 and search history table 126.

Next, in step 2002, the files in the searching profile history file group 128 and search result history file group 129 are erased.

Through the above steps, the history of the user operations, searching profiles and search results after setting of the source document is cleared to end a series of search sessions.

In this phase, by saving the content of the searching profile saving area 124 before clearing the content of the searching profile saving area 124 in the step 2001, the saved content can be reutilized for the next and ensuing search sessions.

The processing procedure in the search session ending program 130 is carried out as described above.

While in the foregoing the processing procedures in the individual programs in the present embodiment have been described, a concrete process flow in the relevance feedback in the embodiment will now be described by making reference to FIGS. 16, 17, 18, 19 and 20.

Referring first to FIG. 16, a concrete process flow in the case where when the user initially inputs a seed document as a search condition, a searching profile is generated to perform a similar document search will be described.

Firstly, in step 1701, a searching profile is generated on the basis of a seed document 1700 by means of the searching profile-generating program 114. More specifically, the seed document 1700 inputted by the user is acquired, characteristic strings are extracted from the seed document 1700 and these strings are assigned with weights so as to be written into the searching profile storing area 124. In an example illustrated in the figure, a seed document "A high-school baseball opens following soccer - - - " is acquired and characteristic strings such as "soccer", "high-school", "baseball" and "opens" and their weights in terms of frequencies of appearance in the seed document are written in the searching profile saving area 124.

Next, in step 1702, a similar document search based on the content of the searching profile saving area 124 is carried out by the similar document searching-program 115 and a search result 1706 is displayed on the display 100.

Subsequently, in step 1703, the content of the searching profile saving area 124 is saved in a file in the searching profile history saving file group 128 by means of the search history saving program 118. In the illustrated example, the content of the searching profile saving area 124 is saved in a file named "0001.pfl" in the searching profile saving file group 128.

Then, in step 1704, the search result 1706 is saved in a file named "0001.res" in the search result history saving file group 129 by means of the search history saving.

Thereafter, in step 1705, the search history saving program 118 writes information in the search history table. In the illustrated example, user operation information to the effect that the user "sets the seed document", the resulting file name "0001.pfl" and the file name "0001.res" saving the search result based on the searching profile are saved in the search history table 126 while being caused to have the correspondence between them and added with a user operation identifier.

The above is the process flow in the case where the searching profile is generated and the similar document search is conducted when the user initially inputs the seed document as a search condition in the present embodiment.

Figure 17:
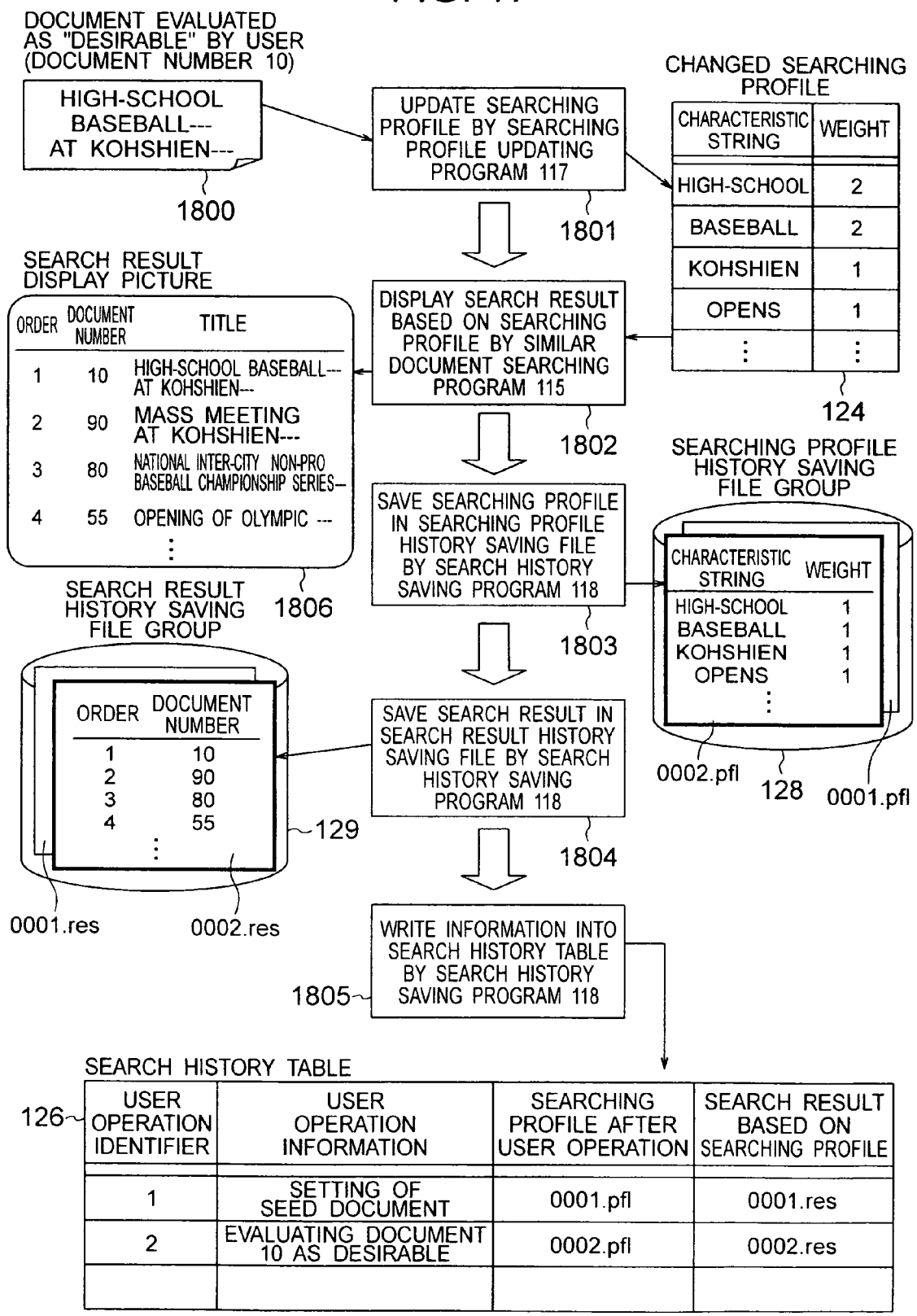
FIG. 17 is a diagram showing a process flow in the case where the user inputs an evaluation for a search result document and a searching profile is updated on the basis of the evaluation to perform re-retrieval in the embodiment of the invention.

Referring now to FIG. 17, a process flow in the case where the user inputs an evaluation for a search result document and the searching profile is updated on the basis of the evaluation to perform re-retrieval in the embodiment will be described.

In an illustrated example, it is assumed that the user inputs an evaluation for a search result document obtained as a result of setting the seed document as shown in FIG. 16 to change the searching profile.

Firstly, in step 1801, the searching profile is updated by means of the searching profile updating program 117. More specifically, characteristic strings are extracted from a document subjected to evaluation by the user and the content of the searching profile saving area 124 is updated on the basis of the extracted strings. In the illustrated example, characteristic strings such as "high-school", "baseball" and "Kohshien (the name of ball park)" are extracted from a document of document number 10 evaluated as desirable by the user. Then, the weights of "high-school" and "baseball" that have already been registered in the searching profile saving area 124 add. "Koshien" that has not been registered till then in the searching profile saving area 124 is newly subjected to additional registration.

Next, in step 1802, a similar document search based on the searching profile updated in the step 1801 is conducted by means of the similar document search program 115 and a search result 1806 is displayed on the display 100.

Subsequently, in step 1803, the content of the searching profile saving area 124 is saved in a file in the searching profile saving file group 128 by means of the search history saving program 118. In the illustrated example, the content of the searching profile saving area 124 is saved in a file named "0002.pfl" in the searching profile saving file group 128.

Then, in step 1804, the search result 1806 is saved in a file in the search result history saving file group 129 by means of the search history saving program 118. In the illustrated example, of the search result 1806, orders and document numbers corresponding to the orders, respectively, are written in a file named "0002.res" in the search result history saving file group 129.

Thereafter, in step 1805, information is written into the search history table by means of the search history saving program 118. In the illustrated example, since the searching profile is updated as a result of the fact that the user evaluates the document of document number 10 as "desirable", user operation information "document 10 is evaluated as desirable", the file name "0002.pfl" saving a searching 1 profile changed by the evaluation and the file name "0002.res" saving the search result based on the changed searching profile are saved in the search history table 126 while being caused to have the correspondence between them and added with a user operation identifier.

The above is the process flow in the case where the user inputs an evaluation for the search result document and the searching profile is updated on the basis of the evaluation to conduct re-retrieval in the present embodiment.

Figure 19:
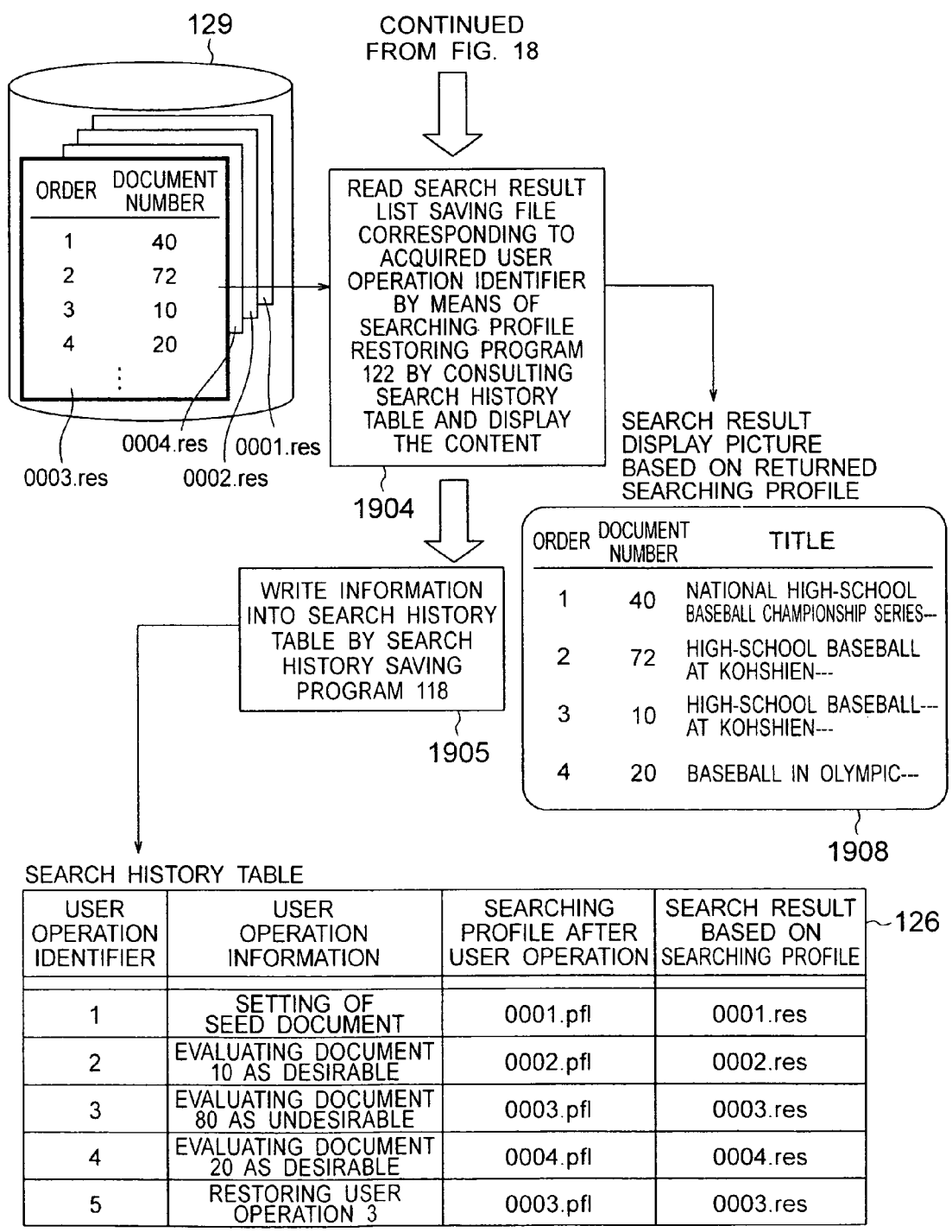
FIG. 19 is a diagram showing a process flow continuing from the process flow in FIG. 18.

Referring now to FIGS. 18 and 19, a process flow in the case where after the user carries out relevance feedback to change the searching profile, the content of a searching profile at a desired time is restored and a search result based on the searching profile is displayed to the user in the present embodiment will be described.

In an example shown in FIGS. 18 and 19; it is assumed that after performing a similar document search by inputting a seed document and inputting evaluations for search result documents three times, the user makes a request for returning the content of searching profile to that immediately after inputting of the second evaluation.

Firstly, in step 1901 shown in FIG. 18, the search history table 126 is consulted by means of the search history-displaying program 121 to display a history of user operations. In the illustrated example, a history of user operations in which after setting the seed document, the user inputs evaluations three times is displayed together with corresponding user operation identifiers.

Next, in step 1903, the searching profile restoring program 122 consults the search history table 126 to read a searching profile history saving file corresponding to a user operation identifier inputted by the user and replace the content of the searching profile saving area 124. In the illustrated example, since an instance is assumed in which the user desires "the searching profile is to be returned to that immediately after document 80 is evaluated as undesirable", the user consults information displayed in the search history displaying picture 1906 to input a corresponding user operation identifier "3". Accordingly, in the present step, a file "0003.pfl" in searching profile history saving file group 128 corresponding to the user operation identifier "3" in the search history table 126 is read and the content of the searching profile saving area 124 is replaced with the content of the file "0003.pfl".

Subsequently, in step 1904 shown in FIG. 19, the searching profile restoring program 122 consults the search history table 126 to read a search result history file corresponding to the user operation identifier inputted by the user and display a search result on the screen. In the illustrated example, a file "0003.res" in search result history saving file group 129 corresponding to the user operation identifier "3" in the search history table 126 is read and its content, that is, document numbers and title of the corresponding individual documents are displayed. Through this, a search result based on a searching profile replaced with the content of the file "0003.pfl" can be displayed.

Thereafter, in step 1905, the search history saving program 118 writes information into the search history table 126. Since, in the illustrated example, the user has returned the searching profile to the state immediately after the user operation of user operation identifier "3", user operation information "restoration of the state after user operation 3", the file name "0003.pfl" saving a searching profile after restoration by the user operation and the file name "0003.res" saving a search result based on the searching profile are saved in the search history table 126 while being caused to have the correspondence between them and added with the user operation identifiers.

The above is the process flow in which the user performs the relevance feedback to change the searching profile and thereafter the content of the searching profile at a desired time is restored to display a search result based on the restored searching profile to the user in the embodiment.

The concrete process flow of the relevance feedback in the present embodiment is carried out as described above.

Figure 20:
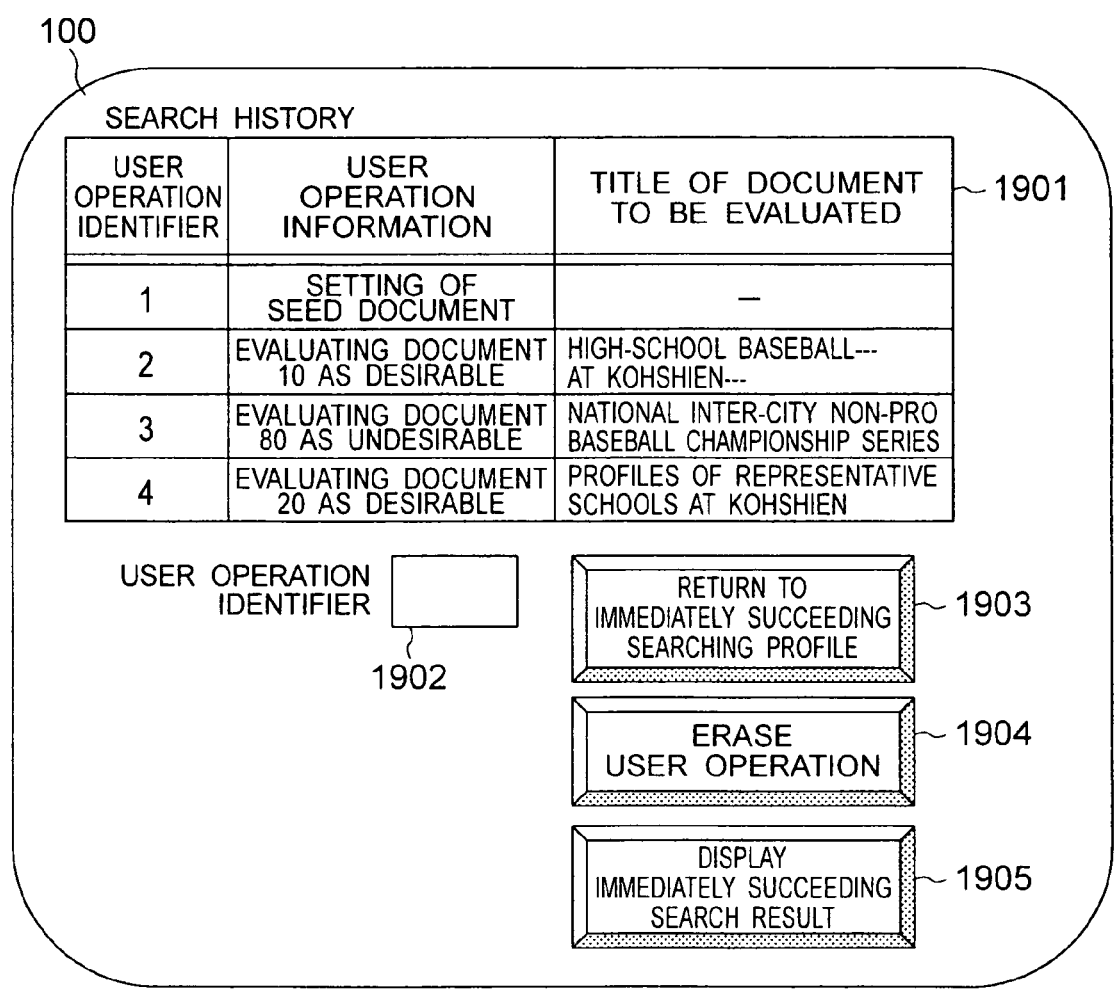
FIG. 20 is a diagram showing an example of a picture displayed when the user makes a request for search history display in the embodiment of the invention.

Referring now to FIG. 20, there is illustrated an example of a picture displayed by the search history displaying program 121 when the user makes a request for search history display in the step 614 shown in FIG. 5 in the present embodiment. Assumptively, in the case of FIG. 20, the user inputs an evaluation in accordance with the procedure exemplified in FIGS. 16 and 17 and thereafter, makes the request for search history display.

At that time, a list 1901 of user operations carried out after the user has set an initial seed document is displayed. When the user operation is an evaluation for a search result document as shown in this figure, a document number of the document subjected to evaluation may be consulted to display an attribute such as title of the document.

The user can input a user operation identifier to a text box 1902 and depress any one of button 1903 for "return the state to the immediately succeeding searching profile", button 1904 for "erase the user operation" and button 1905 for "display the immediately succeeding search result".

When the button 1903 is depressed, the searching profile restoring program 122 is started to restore a searching profile immediately succeeding a searching profile changed by a user operation corresponding to a user operation identifier inputted to the text box 1902.

With the button 1904 depressed, the user operation-erasing program 123 is started to change the searching profile to the state when the user does not execute a user operation corresponding to a user operation identifier inputted to the text box 1902.

With the button 1905 depressed, the search result history-displaying program 120 is started Lo display a search result based on a searching profile immediately succeeding a searching profile changed by a user operation corresponding to a user operation identifier inputted to the text box 1902.

If a "recommencement" button is provided and this button is depressed, it may be considered that the latest user operation identifier is designated and a searching profile preceding execution of the immediately preceding user operation may be restored.

The above is the example of a picture displayed by the search history-displaying program 121 in the present embodiment.

As described above, according to the present embodiment, a desired evaluation designated by the user can be recommenced to return the retrieval profile to that at a desired time. Accordingly, a search result document based on the returned searching profile can be presented and recommencement of an evaluation for the search result document can be permitted. In other words, improvements in accuracy of retrieval based on the trial and error relevance feedback can be realized.

In the present embodiment, document retrieval is carried out for the precedently registered document database but by providing search history tables 126 by the number of a plurality of users, the present invention can also be applied to a text dipping system in which a document coinciding with a searching profile registered by each user can be delivered to each user. In other words, the present invention can be applied to a system in which electronic documents acquired from an information source such as communication company or newspaper company by using, for example, an electronic mail or news collection robot are retrieved by means of searching profiles of a plurality of precedently registered users and documents satisfying a predetermined condition are distributed to the individual users.

Further, dates/times for inputting evaluations may be saved in the search history table 126. In this case, a searching profile of a date/time desirably designated by the user can be restored.

Further, in the search result history displaying program 120, the saved contents of files in the search result history file group 129 may all be merged so as to display all search results acquired in the past in a list form. In this case, documents evaluated by the user through collation with the content of the search history table 126 may be displayed together with evaluation information and user operation identifiers. When the user designates a user operation identifier by consulting this display, a desired evaluation can be recommenced or return to a searching profile at a desired time can be ensured as explained in connection with FIG. 18.

Further, in the present embodiment, the user inputs an evaluation for one search result document but evaluations for more than one search result documents can be inputted at a time and changing to a searching profile reflecting these evaluations may be effected in this case, the same user operation identifier can be assigned to the plurality of evaluations inputted at a time and saved in the search history table.

In the present embodiment, a seed document is initially set and a document having the content similar to that of the seed document is retrieved but a scheme for retrieval of the whole passage in which a keyword is initially set may be employed. In that case, in place of the step 702 shown in FIG. 6, a process may be involved in which the inputted keyword is applied with a weight through a predetermined method and is additionally saved in the searching profile saving area 124.

According to the embodiment set forth so far, in a document retrieval method having relevance feedback, a document evaluated by the user and a history of evaluations are managed by making the correspondence of them with searching profiles at times for evaluations and therefore recommencement of relevance feedback at a desired time can be ensured.

As described above, according to the present invention, recommencement of evaluation for a desired search result document can be permitted to thereby improve the retrieval accuracy.

The invention claimed is:

1. A document retrieval method, involving a series of document retrieval processes including a plurality of retrieval operations inputted by a user, comprising:
    a user's evaluation input step for inputting a user's evaluation of a document retrieved in a document search conducted pursuant to a search query, said user's evaluation including an evaluation as to whether the document is desirable for the user's search purpose;
    a search query storage step for, when updating said search query based on said evaluation, storing a search query after the update in association with the retrieval operation thereof, in addition to those search queries that have been stored in previous retrieval operations conducted before said update in said series of document retrieval processes;
    a search result storage step for storing a search result based on the search query after the update in addition to those search results that have been stored in previous retrieval operations conducted before said update in said series of document retrieval processes; and
    a search history storage step for storing information on a history of the search queries each stored in said search query storage step, information on a history of search results each stored in said search result storage step, and each of user's evaluations and each of identifiers of documents subjected to said evaluations by making a correspondence among the search query, the search result, the user's evaluation and the identifier of the document subjected to the user's evaluation;

wherein a user's evaluation for a search result document is inputted in accordance with a method for setting one or more evaluation grades, the search query includes weights assigned to strings and the weight of a string is updated in accordance with a method for setting the degree of change in many grades pursuant to said evaluation.

2. A document retrieval method according to claim 1, further comprising an evaluation history display step for delivering a list of documents for which the user has inputted evaluations to evaluate said documents as desirable or undesirable in the past on the basis of the information stored in said search history storage step and said evaluations for said documents.

3. A document retrieval method according to claim 1, further comprising a search result history display step for delivering a document delivered as a search result before said search query is updated on the basis of said evaluation even after said search query is updated, on the basis of the information stored in said search history storage step.

4. A document retrieval method according to claim 2, further comprising a search query restoration step for restoring, of the evaluation history delivered in said evaluation history display step, a search query before a desired evaluation is inputted.

5. A document retrieval method according to claim 2, further comprising a search query update step for inputting an evaluation to evaluate a document delivered in said evaluation history display step as desirable or undesirable and updating said search query on the basis of said evaluation input in said search query update step.

6. A document retrieval method according to claim 2, further comprising a user evaluation erase step for erasing a desired one of said evaluations as to desirability or undesirability inputted by the user in said evaluation history display step, in accordance with a request from the user, and updating the search query to the state available when said evaluation is not made.

7. A document retrieval method according to claim 3, further comprising a search query update step for causing the user to input an evaluation to evaluate the document delivered in said search result history display step as desirable or undesirable so as to update said search query on the basis of said evaluation input of said search query update step.

8. A document retrieval method according to claim 7, further comprising a user evaluation erase step for erasing a desired evaluation as to desirability or undesirability inputted by the user and delivered in said search result history display step, in accordance with a request from the user and updating weights of strings in the search query to the state available when said evaluation is not made.

9. A document retrieval system, adapted to perform a series of document retrieval processes including a plurality of retrieval operations inputted by a user, comprising:

user's evaluation input means for inputting a user's evaluation of a document retrieved in a document search conducted pursuant to a search query, said user's evaluation including an evaluation as to whether the document is desirable for the user's search purpose;

search query storage means for storing, when said search query is updated based on said evaluation, a search query after the update in association with the retrieval operation thereof, in addition to those search queries that have been stored in previous retrieval operations conducted before said update in said series of document retrieval processes;

search result storage means for storing a search result based on the search query after the update in addition to those search results that have been stored in previous retrieval operations conducted before said update in said series of document retrieval processes; and search history storage means for storing information on a history of the search queries each stored by said search query storage means, information on a history of search results each stored by said search result storage means, and each of user's evaluations and each of identifiers of documents subjected to said evaluations by making a correspondence among the search query, the search result, the user's evaluation and the identifier of the document subjected to the user's evaluation;

wherein a user's evaluation for a search result document is inputted in accordance with a method for setting one or more evaluation grades, the search query includes weights assigned to strings and the weight of a string is updated in accordance with a method for setting the degree of change in many grades pursuant to said evaluation.

10. A computer-readable recording medium storing a document retrieval program which, when executed by a computer, causes the computer to perform a document retrieval method involving a series of document retrieval processes including a plurality of retrieval operations inputted by a user, the method performed according to the program comprising:

a user's evaluation input step for inputting a user's evaluation of a document retrieved in a document search conducted pursuant to a search query, said user's evaluation including an evaluation as to whether the document is desirable for search purpose;

a search query storage step for storing, when updating said search query based on said evaluation, a search query after the update in association with the retrieval operation thereof, in addition to those search queries that have been stored in previous retrieval operations conducted before said update in said series of document retrieval processes;

a search result storage step for storing a search result based on the search query after the update in addition to those search results that have been stored in previous retrieval operations conducted before said update in said series of document retrieval processes; and a search history storage step for storing information on a history of the search queries each stored in said search query storage step, information on a history of search results each stored in said search result storage step, and each of user's evaluations and each of identifiers of documents subjected to said evaluations by making a correspondence among the search query, the search result, the user's evaluation and the identifier of the document subjected to the user's evaluations;

wherein a user's evaluation for a search result document is inputted in accordance with a method for setting one or more evaluation grades, the search query includes weights assigned to strings and the weight of a string is updated in accordance with a method for setting the degree of change in many grades pursuant to said evaluation.

* * * * *